United States Patent
Wang et al.

(10) Patent No.: US 12,046,116 B2
(45) Date of Patent: Jul. 23, 2024

(54) TRACKPAD WITH FORCE SENSING CIRCUITRY AND CLOUD-BASED EARTHQUAKE DETECTION

(71) Applicant: GOOGLE LLC, Mountain View, CA (US)

(72) Inventors: Jianxun Wang, Sunnyvale, CA (US); Debanjan Mukherjee, San Jose, CA (US)

(73) Assignee: Google LLC, Mountain View, CA (US)

( * ) Notice: Subject to any disclaimer, the term of this patent is extended or adjusted under 35 U.S.C. 154(b) by 107 days.

(21) Appl. No.: 17/756,452

(22) PCT Filed: Nov. 26, 2019

(86) PCT No.: PCT/US2019/063425
§ 371 (c)(1),
(2) Date: May 25, 2022

(87) PCT Pub. No.: WO2021/107939
PCT Pub. Date: Jun. 3, 2021

(65) Prior Publication Data
US 2023/0005352 A1    Jan. 5, 2023

(51) Int. Cl.
*G08B 21/00* (2006.01)
*G01V 1/01* (2024.01)
(Continued)

(52) U.S. Cl.
CPC .............. *G08B 21/10* (2013.01); *G01V 1/01* (2024.01); *G01V 1/288* (2013.01); *G01V 1/30* (2013.01)

(58) Field of Classification Search
CPC ........ G08B 21/10; G01V 1/008; G01V 1/288; G01V 1/30
(Continued)

(56) References Cited

U.S. PATENT DOCUMENTS 9,286,781 B2    3/2016 Filson et al.
2010/0169021 A1    7/2010 Moisio
(Continued)

FOREIGN PATENT DOCUMENTS

EP    3165997 A1 *    5/2017    ............. G06F 3/016
EP    3165997 A1    5/2017
(Continued)

OTHER PUBLICATIONS

International Search Report and Written Opinion for PCT Application No. PCT/US2019/063425, mailed on Jul. 29, 2020, 10 pages.
(Continued)

*Primary Examiner* — Naomi J Small
(74) *Attorney, Agent, or Firm* — Shumaker & Sieffert, P.A.

(57) ABSTRACT

According to one aspect, a computer-implemented method for detecting an earthquake includes detecting vibrations in a trackpad of a computing device using an inductive element and force sensing circuitry of the trackpad and, processing, by a microcontroller of the computing device, the vibrations for detection of an earthquake vibration signal. In response to detecting the earthquake vibration signal, communicating, by the computing device, the earthquake vibration signal to a remote server and receiving, at the computing device, an earthquake alert from the remote server.

18 Claims, 16 Drawing Sheets

(51) Int. Cl.
    *G01V 1/28*     (2006.01)
    *G01V 1/30*     (2006.01)
    *G08B 21/10*    (2006.01)

(58) Field of Classification Search
    USPC .......................................................... 340/635
    See application file for complete search history.

(56) References Cited

U.S. PATENT DOCUMENTS

| | | | |
|---|---|---|---|
| 2018/0293867 A1* | 10/2018 | Yang ...................... | G08B 25/10 |
| 2019/0137642 A1* | 5/2019 | Hippeläinen .......... | G01V 1/104 |
| 2022/0276402 A1* | 9/2022 | Kuwamori ............... | G01V 1/01 |

FOREIGN PATENT DOCUMENTS

| | | | | |
|---|---|---|---|---|
| JP | 2016193683 A | * | 11/2016 | ................ B60Q 9/00 |
| WO | WO-2018066028 A1 | * | 4/2018 | ............. B60K 35/00 |

OTHER PUBLICATIONS

International Preliminary Report on Patentability from International Application No. PCT/US2019/063425, dated May 17, 2022, 7 pp.

\* cited by examiner

TRACKPAD WITH FORCE SENSING CIRCUITRY AND CLOUD-BASED EARTHQUAKE DETECTION

CROSS REFERENCE TO RELATED APPLICATION

This application is a 35 U.S.C. § 371 National Phase Entry Application from PCT/2019/063425 filed Nov. 26, 2019, designating the U.S., the disclosure of which is incorporated herein by reference in its entirety.

TECHNICAL FIELD

This document relates, generally, to a trackpad with force sensing circuitry and cloud-based earthquake detection.

BACKGROUND

Some devices use a trackpad or touchpad to register input from a user to the system. Input can be registered as position information to guide the user in pointing to objects or locations on an accompanying screen. Input can be registered as a force or displacement, to allow the user to click on a displayed object. Some existing trackpads are designed with a hinged surface that pivots along one of its edges, to allow the user to input taps or clicks. Such actuation can therefore be constrained to pressing primarily on a particular section of the pad. Some trackpads can provide tactile feedback, sometimes referred to as haptic feedback.

SUMMARY

According to one aspect, a computer-implemented method for detecting an earthquake includes detecting vibrations in a trackpad of a computing device using an inductive element and force sensing circuitry of the trackpad and, processing, by a microcontroller of the computing device, the vibrations for detection of an earthquake vibration signal. In response to detecting the earthquake vibration signal, communicating, by the computing device, the earthquake vibration signal to a remote server and receiving, at the computing device, an earthquake alert from the remote server.

Implementations may include any or all of the following features. For example, detecting the vibrations in the trackpad of the computing device may include measuring a change in distance in a gap between the inductive element and a target plate of the trackpad. The target plate may be a bottom housing of the computing device. Processing, by the microcontroller of the computing device, the vibrations for detection of the earthquake vibration signal may include determining no touch input detected on the trackpad, determining the computing device is being charged, determining the vibrations exceed a threshold vibration level, and in response to determining no touch input detected, the computing device is being charged, and the vibrations exceed the threshold vibration level, generating the earthquake vibration signal. The earthquake vibration signal may include data from the inductive element, a location of the computing device, and a timestamp of detecting the vibrations. The method may further include receiving a user feedback option enabling a response to the earthquake alert.

According to one aspect, a computer-implemented method for detecting an earthquake includes receiving, at a remote server, multiple earthquake vibration signals generated from multiple computing devices through vibrations detected on trackpads of the computing devices, aggregating the earthquake vibration signals, and inputting the aggregated earthquake vibration signals into a machine learning module. The method includes processing, by the machine learning module, the aggregated earthquake vibration signals to detect an earthquake in a location and, in response to detecting the earthquake by the machine learning module, sending an earthquake alert to the multiple computing devices.

Implementations may include any or all of the following features. The vibration signals may include data from an inductive element in the trackpads of the computing devices, locations of the computing devices, and/or timestamps of a time the vibrations were detected on the trackpads. Processing, by the machine learning module, the aggregated earthquake vibration signals may include determining the aggregated earthquake vibration signals are a false positive, e.g., based on the data from the inductive element in the trackpads not having periodic vibrations, and not sending the earthquake alert. Processing, by the machine learning module, the aggregated earthquake vibration signals may include determining the aggregated earthquake vibration signals are a false positive based on locations of the computing devices defining an area within a threshold area. The method may further include sending the earthquake alert to other multiple computing devices in response to detecting the earthquake by the machine learning module. The method may further include sending a user feedback option to the multiple computing devices to enable a response to the earthquake alert.

According to one aspect, an electronic device includes a housing, a microcontroller disposed in the housing, and a trackpad mounted to the housing and operably connected to the microcontroller. The trackpad includes a substrate, a stiffener plate, and a circuit board between the substrate and the stiffener plate, where the circuit board includes position detecting circuitry configured to detect a position of an object adjacent the substrate and the circuit board includes an inductive element. The trackpad includes a grounding element that electrically connects the stiffener plate and the circuit board to each other, and force sensing circuitry configured to detect force applied to the substrate, where the force is detected using the inductive element. The trackpad is configured to detect vibrations using the inductive element and the force sensing circuitry, and the microcontroller is configured to process the vibrations for detection of an earthquake vibration signal, in response to detecting the earthquake vibration signal, communicate the earthquake vibration signal to a remote server, and receive an earthquake alert from the remote server.

Implementations may include any or all of the following features. For example, the trackpad may be configured to detect the vibrations by measuring a change in distance in a gap between the inductive element and a target plate of the trackpad, where a bottom of the housing is the target plate. The microcontroller is further configured to determine no touch input detected on the trackpad, determine the electronic device is being charged, determine the vibrations exceed a threshold vibration level, and in response to determining no touch input detected, the electronic device is being charged, and the vibrations exceed the threshold vibration level, generate the earthquake vibration signal. The earthquake vibration signal may include data from the inductive element, a location of the computing device, and a timestamp of detecting the vibrations.

According to an aspect, a system for detecting an earthquake includes at least one memory including instructions, and at least one processor that is operably coupled to the at least one memory and that is arranged and configured to execute instructions that, when executed, cause the at least one processor to implement an application. The application includes a signal receiving module configured to receive multiple earthquake vibration signals generated from multiple computing devices through vibrations detected on trackpads of the computing devices and aggregate the earthquake vibration signals and input the aggregated earthquake vibration signals into a machine learning module. The application includes the machine learning module that is configured to process the aggregated earthquake vibration signals to detect an earthquake in a location. The application includes a communication module that is configured to send an earthquake alert to the multiple computing devices in response to detecting the earthquake by the machine learning module.

Implementations may include any or all of the following features. For example, the vibration signals may include data from an inductive element in the trackpads of the computing devices, locations of the computing devices, and/or timestamps of a time the vibrations were detected on the trackpads. The communication module may be further configured to send the earthquake alert to other multiple computing devices in response to detecting the earthquake by the machine learning module. The communication module may be further configured to send a user feedback option to the multiple computing devices to enable a response to the earthquake alert.

According to one aspect, a trackpad includes: a substrate; a stiffener plate; a circuit board between the substrate and the stiffener plate, the circuit board comprising position detecting circuitry configured to detect a position of an object adjacent the substrate, the circuit board including an inductive element; a grounding element that electrically connects the stiffener plate and the circuit board to each other; and force sensing circuitry configured to detect force applied to the substrate, the force detected using the inductive element.

Implementations can include any or all of the following features. The trackpad further includes an actuator configured to generate haptic output. The trackpad further includes a fastener that secures the actuator to the circuit board. The trackpad further includes a self-clinching nut mounted to the circuit board, wherein the fastener couples to the self-clinching nut. The trackpad further includes a protective layer covering the inductive element. The inductive element comprises a coil. The coil comprises a planar spiral positioned flat against a main surface of the circuit board. The planar spiral comprises a copper trace of the circuit board. The grounding element comprises multiple rectangular metal elements in contact with the stiffener plate and the circuit board.

The trackpad further includes a spring having a bias portion configured to bear against the stiffener plate. The trackpad further includes first and second fastening portions, wherein the bias portion is located between the first and second fastening portions. The spring comprises a 180-degree turn between the bias portion and at least one of the first or second fastening portions. The spring comprises a first 180-degree turn between the bias portion and the first fastening portion, and a second 180-degree turn between the bias portion and the second fastening portion. The bias portion is wider than connections between the bias portion and the first and second fastening portions, respectively. The spring is S-shaped across the first fastening portion, the bias portion, and the second fastening portion. Each of the first and second fastening portions is aligned with a respective edge of the stiffening plate, the edges adjacent and perpendicular to each other. The trackpad further includes a further grounding element that electrically connects the stiffener plate and the housing to each other. The further grounding element has a spiral shape.

According to one aspect, an electronic device comprising a housing and a trackpad as described above is disclosed, the trackpad being mounted to the housing. In the context of the example wherein the trackpad further comprises the spring having the bias portion configured to bear against the stiffener plate, the spring may be arranged between the stiffener plate and the housing, the spring facilitating a change in distance between the stiffener plate and the housing based on a force applied to the substrate. Further, in the context of the example wherein the spring comprises first and second fastening portions, the first and second fastening portions may be coupled to the housing.

In one aspect, an electronic device includes: a housing; a trackpad mounted to the housing, the trackpad comprising: a substrate; a stiffener plate; and a circuit board between the substrate and the stiffener plate for detecting a position of an object adjacent the substrate, the circuit board including an inductive element; a spring between the stiffener plate and the housing, the spring facilitating a change in distance between the stiffener plate and the housing based on a force applied to the substrate; and force sensing circuitry that detects the force using the inductive element.

Implementations can include any or all of the following features. The spring comprises first and second fastening portions coupled to the housing, and a bias portion configured to bear against the stiffener plate, the bias portion located between the first and second fastening portions. The spring comprises a 180-degree turn between the bias portion and at least one of the first or second fastening portions. The spring comprises a first 180-degree turn between the bias portion and the first fastening portion, and a second 180-degree turn between the bias portion and the second fastening portion. The bias portion is wider than connections between the bias portion and the first and second fastening portions, respectively. The spring is S-shaped across the first fastening portion, the bias portion, and the second fastening portion. Each of the first and second fastening portions is aligned with a respective edge of the stiffening plate, the edges adjacent and perpendicular to each other. The electronic device further includes an actuator configured to generate haptic output, a self-clinching nut mounted to the circuit board, and a fastener coupling the actuator to the self-clinching nut. The electronic device further includes a first grounding element that electrically connects the stiffener plate and the housing to each other. The first grounding element has a spiral shape. The electronic device further includes a second grounding element that electrically connects the stiffener plate and the circuit board to each other.

BRIEF DESCRIPTION OF DRAWINGS

Like reference symbols in the various drawings indicate like elements.

DETAILED DESCRIPTION

Figure 1:
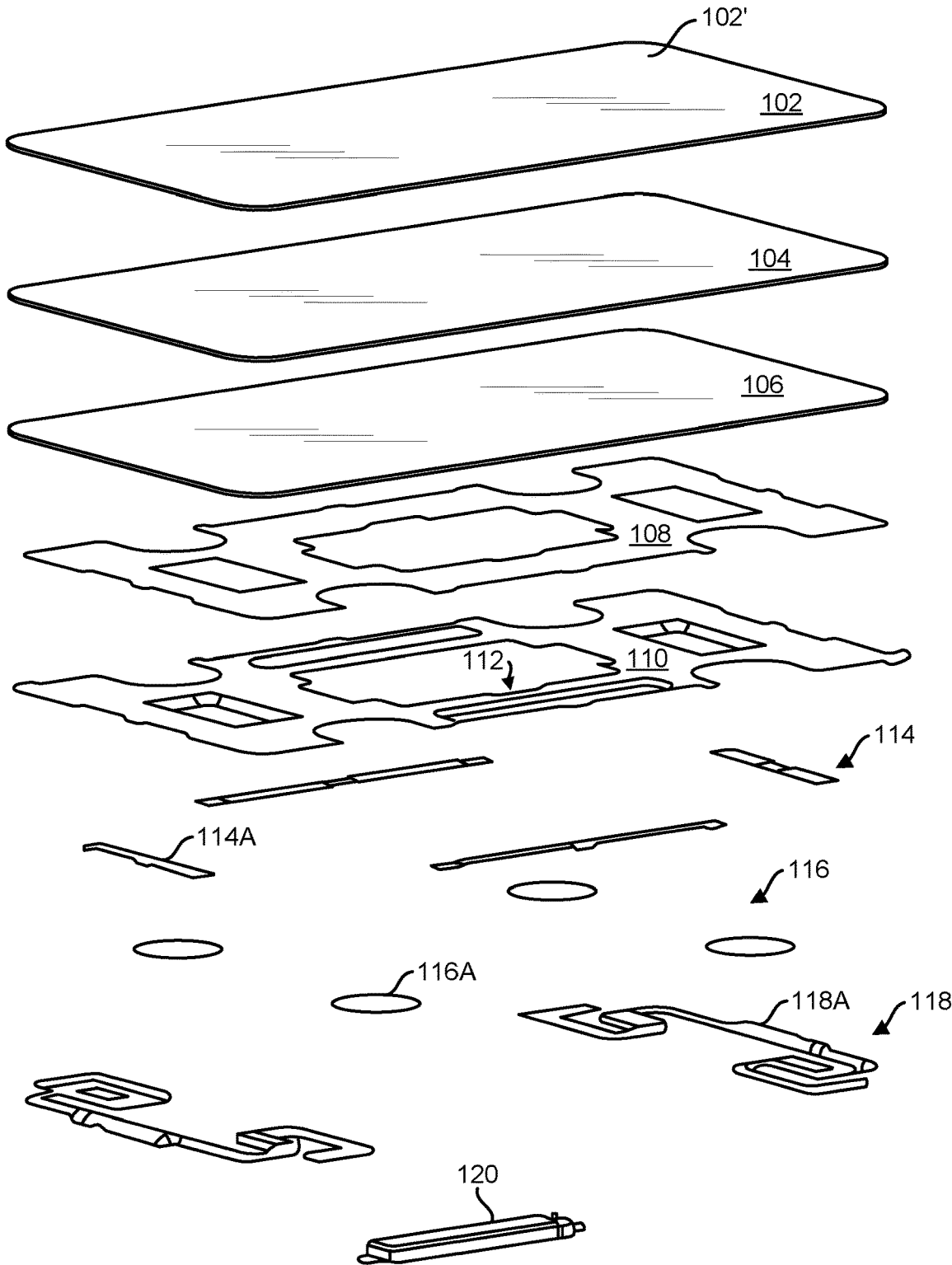
FIG. 1 shows an exploded view of an example of a trackpad architecture.

This document describes examples of input devices, such as trackpads or touchpads, that have improved architectures for performing force detection and/or haptic output to the user. In some implementations, force detection (e.g., to recognize that a user "clicks" using a finger or stylus) can be performed based on inductive detection. For example, a spring can facilitate the movement of at least part of a trackpad assembly as a result of the applied force. In some implementations, haptic output is provided by an actuator mounted to a circuit board. In some implementations, grounding of a circuit board in a trackpad assembly is provided.

A trackpad or touchpad are mentioned herein as examples and can be considered synonymous. Either or both of these can feature a surface formed by a substrate (e.g., glass, metal and/or a synthetic material such as a polymer) intended to be touched by the user in order to make one or more inputs into a system. For example, the user can place one or more fingers and/or one or more other objects (e.g., a stylus) on the surface of the substrate to generate such input(s). In some implementations, more complex inputs can be recognized, including, but not limited to, gestures, sequences and/or patterns.

Position detection can be performed using any suitable technology. In some implementations, capacitive sensing is used. For example, the presence of a fingertip and/or a capacitive stylus at or near the surface of the substrate can change the electrical capacitance of that portion of the substrate, and therefore be registered as an input. As such, while examples herein mention the user touching a substrate in order to make input, it may be sufficient to place an object sufficiently close to, without actually touching, the substrate. In some implementations, resistive sensing is used. For example, the presence of an object can alter the resistance of electrodes in or on the substrate, thereby facilitating recognition of the input.

An input device such as a trackpad can be used solely to allow the user to make input, or it can simultaneously or at other times perform one or more other functions as well. In some implementations, the trackpad can provide haptic output to the user. For example, this can be done by displacing the substrate (e.g., in a vibration-like fashion) in a way that can be tactilely perceived by the user. In some implementations, the trackpad can also feature a display mechanism configured to output visual information to the user, in analogy to how a touchscreen operates. For example, and without limitation, trackpad technology described herein can be implemented as part of a touchscreen such that a display can present information to the user and the trackpad (which can occupy the same area as the display) can register user inputs (e.g., taps, selections and/or dragging of objects).

This document also describes devices, systems, and techniques for using an aggregation of trackpads to detect an earthquake. In some implementations, the trackpad can detect vibrations in the trackpad using the inductive element and force sensing circuitry of the trackpad. The detected vibrations can be processed and evaluated by a microcontroller to determine if the detected vibrations are the result of an earthquake. When the microcontroller determines that the vibrations are due to an earthquake, the computing device using the trackpad can communicate an earthquake vibration signal to a remote server. The earthquake vibration signal may includes multiple different attributes including raw data from the inductive element, a location of the computing device, and a timestamp of detecting the vibrations. The computing device uses techniques described below to eliminate vibrations caused by something other than an earthquake. The remote server receives the earthquake vibration signal from the computing device as well as from other computing devices. The remote server aggregates the received earthquake vibration signals and processes the aggregated earthquake vibration signals. The remote server may use machine learning techniques to process the aggregated earthquake vibration signals to detect an earthquake in a location. Upon detection of an earthquake based on the machine learning techniques, the remote server can communicate an earthquake alert to the computing devices that sent the earthquake vibration signals, as well as to other computing devices in a broader affected area. In some implementations, the machine learning techniques may eliminate false positives and not generate the earthquake alert when the machine learning techniques determine that aggregated earthquake vibration signals are not attributable to an earthquake.

FIG. 1 shows an exploded view of an example of a trackpad architecture 100. The exploded view illustrates exemplary components somewhat separated from each other for purposes of clarity, with such components being assembled into a functioning assembly in an operative implementation. The trackpad architecture 100 can be used in any or all examples described herein. For example, the trackpad architecture 100 can be implemented in one or more devices exemplified below with reference to FIG. 17. For example, and without limitation, a mobile device, a smartphone, a tablet, a laptop, a personal computer, a wearable device, an appliance, a television, a vehicle, and/or another user electronic device can have the trackpad architecture 100.

The trackpad architecture 100 includes a substrate 102 with a surface 102' that can be intended to be facing toward a user. For example, the surface 102' can be accessible to the user, such as by way of the user's finger(s) and/or a stylus or other object. In some implementations, the substrate 102 can include glass. For example, soda lime glass can be used. The substrate 102 can be treated in one or more ways. For example, the surface 102' can be sandblasted. The substrate 102 can be transparent, partially transparent, partially opaque, or opaque. In some implementations, the surface opposite the surface 102' can be treated in one or more ways. For example, a material (e.g., ink and/or epoxy) can be applied (e.g., by a printing process, such as by silkscreen printing).

The trackpad architecture 100 can include a layer 104. For example, the layer 104 can be applied to some or all of the surface that is opposite the surface 102' of the substrate 102. In some implementations, the layer 104 is at least in part adhesive. Any suitable type of adhesive can be used. For example, the layer 104 can include a pressure-sensitive adhesive. As another example, the layer 104 can include a heat-activated film.

The trackpad architecture 100 can include a circuit board 106 for detecting a position of an object adjacent the substrate 102. In some implementations, the circuit board 106 includes electrical or electronic components, and connections between them, for sensing the contact or the proximate presence of an object such as the user's finger(s) and/or a stylus, and to generate a corresponding position signal. For example, capacitive and/or resistive sensing can be used for the sensing. Such a position signal can be used for one or more purposes by a system. The position signal can cause one or more actions to be performed, and/or one or more actions to be inhibited, in the system. For example, and without limitation, the position signal can select an object, move an object, generate a sound, and/or switch a device into a different state (e.g., on or off).

In some implementations, the circuit board 106 includes electrical or electronic components, and connections between them, for sensing the force applied by the contact of an object such as the user's finger(s) and/or a stylus with the substrate 102, and to generate a corresponding force signal. The force sensing can be based on inductive measurement by way of one or more inductive elements positioned on or within the circuit board 106. For example, the change in inductance as a result of displacement of at least the circuit board 106 relative to another component of the system (e.g., a target plate or a housing of a device implementing the system) may be determined. The force sensing can be done using a force sensing circuit that detects force applied to the substrate 102 using the inductive element(s). Solely by way of example, inductive force sensing may be advantageous compared to another approach such as capacitive sensing in that inductive sensing may provide a greater signal-to-ratio. Accordingly, inductive force sensing can provide a greater resolution, to name just one example.

The generated force signal(s) can be used for one or more purposes by a system. The force signal can cause one or more actions to be performed, and/or one or more actions to be inhibited, in the system. For example, and without limitation, the force signal can be recognized by the system as a click or tap, and the appropriate action(s) can be taken in response. In some implementations, the circuit board 106 can include a printed circuit board (PCB) or a PCB assembly (PCBA).

The layer 104 can contact at least one of the substrate 102 or the circuit board 106. In some implementations, the layer 104 serves at least in part for assembling the substrate 102 to the circuit board 106.

The trackpad architecture 100 can include a layer 108. In some implementations, the layer 108 is at least in part adhesive. Any suitable type of adhesive can be used. For example, the layer 108 can include a pressure-sensitive adhesive. As another example, the layer 108 can include a heat-activated film.

The trackpad architecture 100 can include a stiffener plate 110 to provide structural integrity to the circuit board 106 and/or to the substrate 102. For example, the stiffness can counteract any force that is applied as part of a user touching or pressing on the substrate 102. As such, in an implementation that includes the stiffener plate 110, the circuit board 106 and/or the substrate 102 need not be made as stiff as they otherwise might have been. The stiffener plate 110 can be made of metal. In some implementations, the stiffener plate 110 includes steel. For example, stainless steel can be used. In some implementations, the stiffener plate 110 includes aluminum. For example, an aluminum alloy can be used. The stiffener plate 110 can be stamped from material stock (e.g., a sheet of metal). The stiffener plate 110 can have one or more openings. In some implementations, an opening 112 can be provided in the stiffener plate 110. For example, the opening 112 can accommodate a haptic feedback component (e.g., as mounted to the circuit board 106).

The layer 108 can contact at least one of the circuit board 106 or the stiffener plate 110. In some implementations, the layer 108 serves at least in part for assembling the stiffener plate 110 to the circuit board 106.

The trackpad architecture 100 can include one or more grounding elements. In some implementations, the trackpad architecture 100 includes grounding elements 114 that electrically connect the stiffener plate 110 and the circuit board 106 to each other. For example, the grounding elements 114 can be positioned between the stiffener plate 110 and the circuit board 106 so as to make electrical contact with the stiffener plate 110 and the circuit board 106 (e.g., with a ground contact provided on the circuit board 106). In the present illustration, the grounding elements are shown away from the stiffener plate 110 and the circuit board 106 for illustrative purposes. The grounding elements 114 can be made of any suitable electrically conductive material. In some implementations, the grounding elements 114 include metal.

Grounding elements (e.g., the grounding elements 114) can protect the circuit board 106 and components thereof against electrostatic discharge (ESD). This can prevent damage to integrated circuits of the circuit board 106 (e.g., components on a PCBA). For example, the grounding element(s) can lead charges from the circuit board 106 to a housing to facilitate that a high-voltage ESD is dissipated in the remainder of the system (e.g., in the body of a laptop computer or other electronic device). The grounding elements 114 can have any suitable shape. For example, a grounding element 114A is here substantially planar and has an essentially rectangular shape. As such, the trackpad architecture 100 can include multiple rectangular metal elements that are in contact with the stiffener plate 110 and the circuit board 106. When the stiffener plate 110 includes an electrically conductive material and is electrically in contact with the housing, the grounding element(s) 114 can provide an electrically conductive path between the circuit board 106 and the stiffener plate 110, thereby helping to lead charges from the circuit board 106 to the housing.

The trackpad architecture 100 can include one or more protective layers covering at least a portion of the circuit board 106. In some implementations, a protective layer 116 includes one or more pieces configured to cover the inductive element(s) on the circuit board 106. The protective layer 116 can have any suitable shape and be made of any suitable material. For example, a protective layer 116A is here substantially disk-shaped. For example, the protective layer 116A can be made of a non-inductive film such as plastic (e.g., having an adhesive material on one or more sides). The protective layer 116 can include one or more of the protective layer 116A. Here, four of the protective layer 116A that are substantially identical to each other are shown.

The trackpad architecture 100 can include at least one spring. In some implementations, the trackpad architecture 100 includes one or more springs 118 configured for placement between the stiffener plate 110 and a housing (not shown) of the system (e.g., a housing of an electronic device). The spring(s) 118 can facilitate a change in distance between the stiffener plate 110 and the housing (not shown) based on a force applied to the substrate 102. For example, the change in distance can cause a change in inductance that when sensed can be used to detect the applied force. A spring 118A can be made of any material having suitable stiffness to bias the trackpad assembly. In some implementations, the spring 118A is made at least in part from metal (e.g., but not limited to, stainless steel). For example, the spring 118A can be stamped from metal stock (e.g., so that the spring 118A has uniform thickness and/or is essentially planar). The spring 118 can include one or more of the spring 118A. Here, two instances of the spring 118A that are substantially identical to each other (e.g., symmetrical) are shown. The spring 118A can provide more design flexibilities and/or offer a weight reduction compared to an approach where the trackpad assembly is supported by a plate configured to flex under the applied force. For example, the spring 118A can advantageously provide both a suspension system for the trackpad, and serve for integration of the trackpad into the overall system (e.g., a laptop computer or other electronic device).

The trackpad architecture 100 can include an actuator 120 configured to provide haptic output (e.g., a perceptible tactile sensation) to the user via the substrate 102. In some implementations, the actuator 120 is coupled to the circuit board 106. For example, the actuator 120 can be mounted to the circuit board 106 on the surface opposite the surface that faces the substrate 102. The opening 112 can facilitate placement of the actuator 120 on the circuit board 106. In some implementations, the actuator 120 can include an electromagnetic actuator. For example, a linear resonant actuator can be used.

As such, the trackpad architecture 100 is an example of an architecture that can be used for a trackpad that includes a substrate (e.g., the substrate 102), a stiffener plate (e.g., the stiffener plate 110), a circuit board (e.g., the circuit board 106) between the substrate and the stiffener plate for detecting a position of an object adjacent the substrate. The circuit board can include an inductive element (not shown). The trackpad can include a spring (e.g., the spring 118A) between the stiffener plate and the housing, the spring facilitating a change in distance between the stiffener plate and the housing based on a force applied to the substrate. The trackpad can include force sensing circuitry (not shown) that detects the force using the inductive element.

Figure 2:
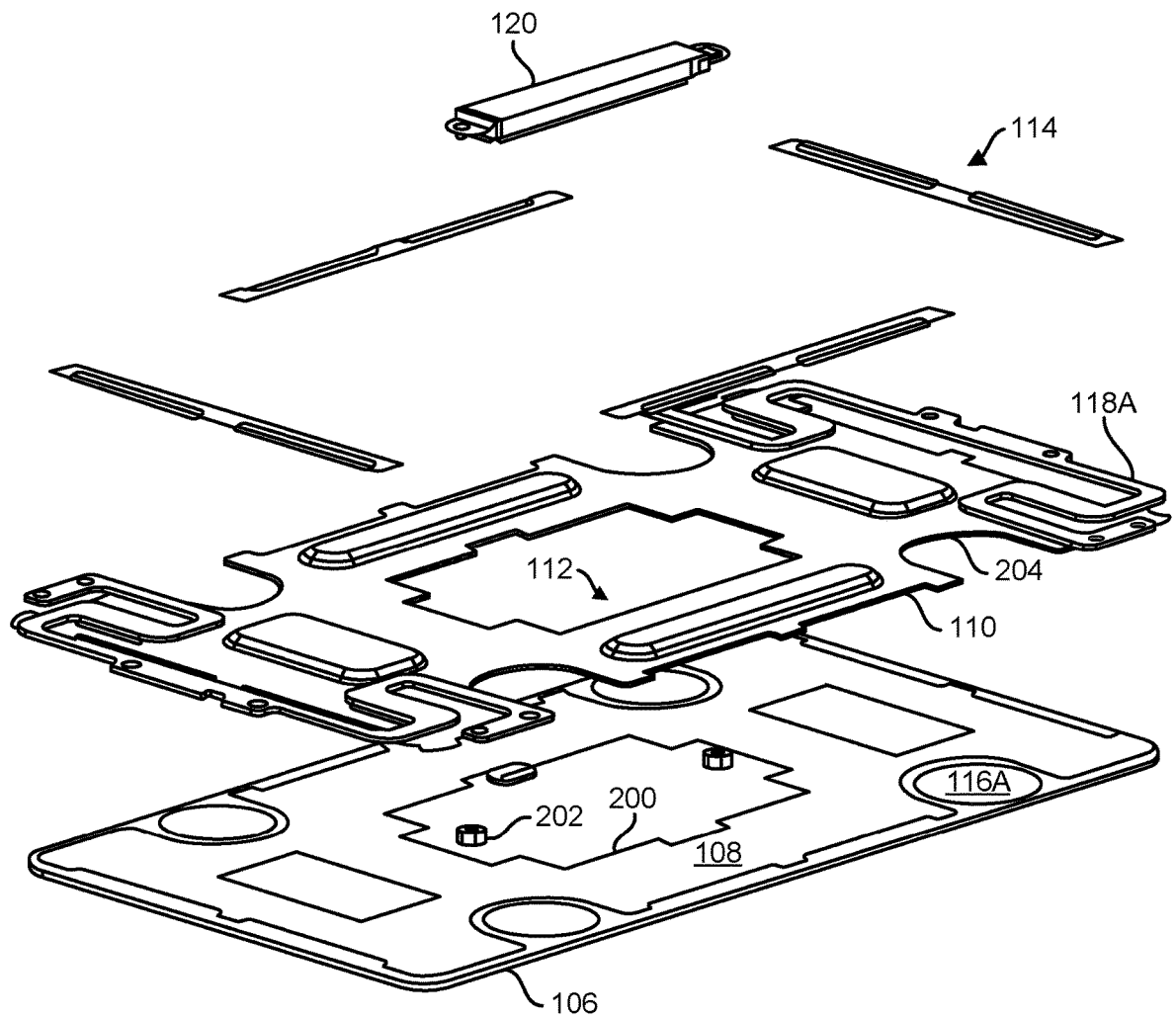
FIG. 2 shows an exploded view of another example of the trackpad architecture of FIG. 1.

FIG. 2 shows an exploded view of another example of the trackpad architecture 100 of FIG. 1. Here, the trackpad architecture 100 is shown from a different perspective than the one discussed above. Also, some components of the trackpad architecture 100 are assembled together or omitted in the present example. Here, the layer 108 is positioned adjacent (e.g., abutting) the circuit board 106. The stiffener plate 110 is shown having two of the spring 118A positioned at respective ends thereof. The grounding elements 114 are shown, as is the actuator 120.

The layer 108 can include an opening 200 that defines a space for placement of the actuator 120 on the circuit board 106. For example, the opening 112 in the stiffener plate 110 can facilitate the placement of the actuator 120. In some implementations, one or more structures at the circuit board 106 can be used in the mounting of the actuator 120. For example, self-clinching nuts 202 are here shown attached to the circuit board 106 and can facilitate attachment of the actuator 120. The stiffener plate 110 can include openings and/or cutouts that facilitate force sensing (e.g., by inductive measurement). Here, features 204 in the stiffener plate 110 serve to expose inductive elements (e.g., positioned adjacent, and currently covered by, the protective layer 116A), for example so that inductance can be measured.

Figure 3:
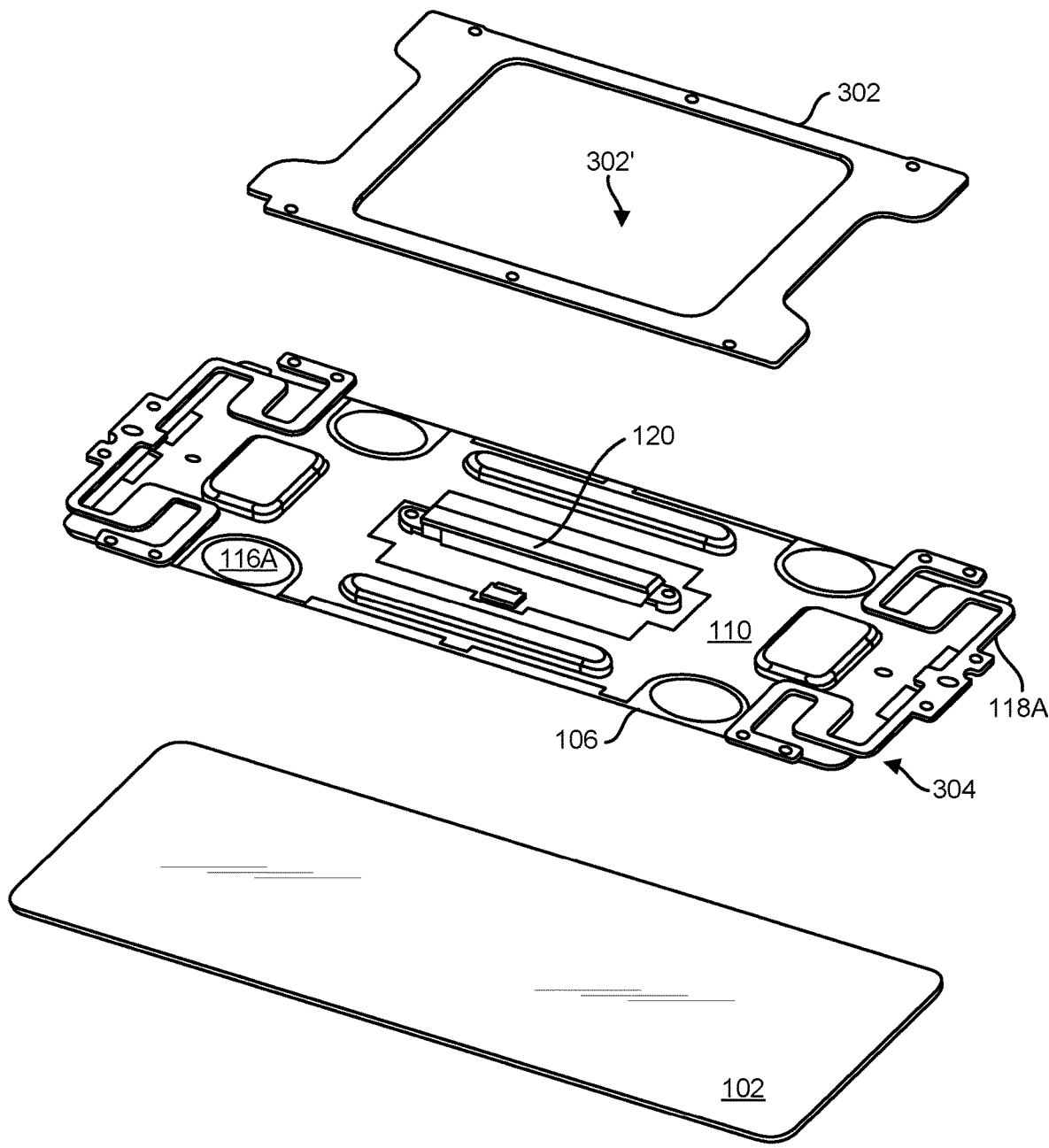
FIG. 3 shows an exploded view of an example of a trackpad architecture including a target plate.

FIG. 3 shows an exploded view of an example of a trackpad architecture 300 including a target plate 302. The trackpad architecture 300 can be used in any or all examples described herein. For example, the trackpad architecture 300 can be implemented in one or more devices exemplified below with reference to FIG. 17. In the trackpad architecture 300, a trackpad assembly 304 can include one or more components of the trackpad architecture 100 (FIG. 1). For example, the trackpad assembly 304 can include the circuit board 106, the stiffener plate 110, the spring(s) 118A, the protective layer 116A, and/or the actuator 120. The trackpad assembly 304 is here shown positioned for assembly to the substrate 102.

The target plate 302 can be used in inductive sensing that also involves one or more inductive elements (e.g., that may be covered by the protective layer 116A in the present illustration). In some implementations, the inductance of such inductive element(s), and/or a change in such inductance, can be detected or determined. For example, a change in inductance caused by dislocation of the trackpad assembly 304 and the substrate 102 as the user presses on the substrate 102, can be interpreted as a force on the trackpad and accordingly trigger a force signal in the system. As such, the trackpad architecture 100 can include an inductive force sensor that can detect inputs such as the user clicking, or pressing, on the substrate 102.

The target plate 302 can be made of metal. In some implementations, the target plate 302 includes steel. For example, stainless steel, aluminum (e.g., an alloy), magnesium alloy, and/or a composite material can be used. The target plate 302 can be stamped from material stock (e.g., a sheet of metal). The target plate 302 can be attached to another component (not shown). For example, the target plate 302 can be secured to a housing of an electronic device (e.g., a laptop or other computer device). As another example, an implementation can omit the target plate 302, wherein a portion of the housing (e.g., a metal body that at least partially encloses the system or device, including, but not limited to, a unibody housing) can instead serve the function of being used in inductive force sensing. The target plate 302 can have one or more openings. Here, an opening 302' is located in the center of the target plate 302. The opening 302' can reduce the amount of material used in the target plate 302, and/or accommodate one or more components (e.g., the actuator 120). One or more other openings may be used (e.g., for attachment purposes). The opening(s) (e.g., the opening 302') can facilitate accommodation of one or more components on the circuit board 106. For example, the actuator 120 and/or other components (e.g., a connector for power and digital signal to a motherboard) can be accommodated on the circuit board 106 by way of the opening 302'.

The substrate 102 and the trackpad assembly 304 can be joined to each other in any suitable way. In some implementations, one or more adhesives are used for attachment.

For example, the layer 104 (FIG. 1) can provide adhesive(s) to affix the substrate 102 and the trackpad assembly 304 to each other.

The target plate 302 and the trackpad assembly 304 can be joined to each other in any suitable way. In some implementations, one or more springs (e.g., the spring 118A) are used for attachment. For example, one or more fasteners (e.g., a bolt or screw) can affix the target plate 302 and the spring 118A to each other.

Figure 4:
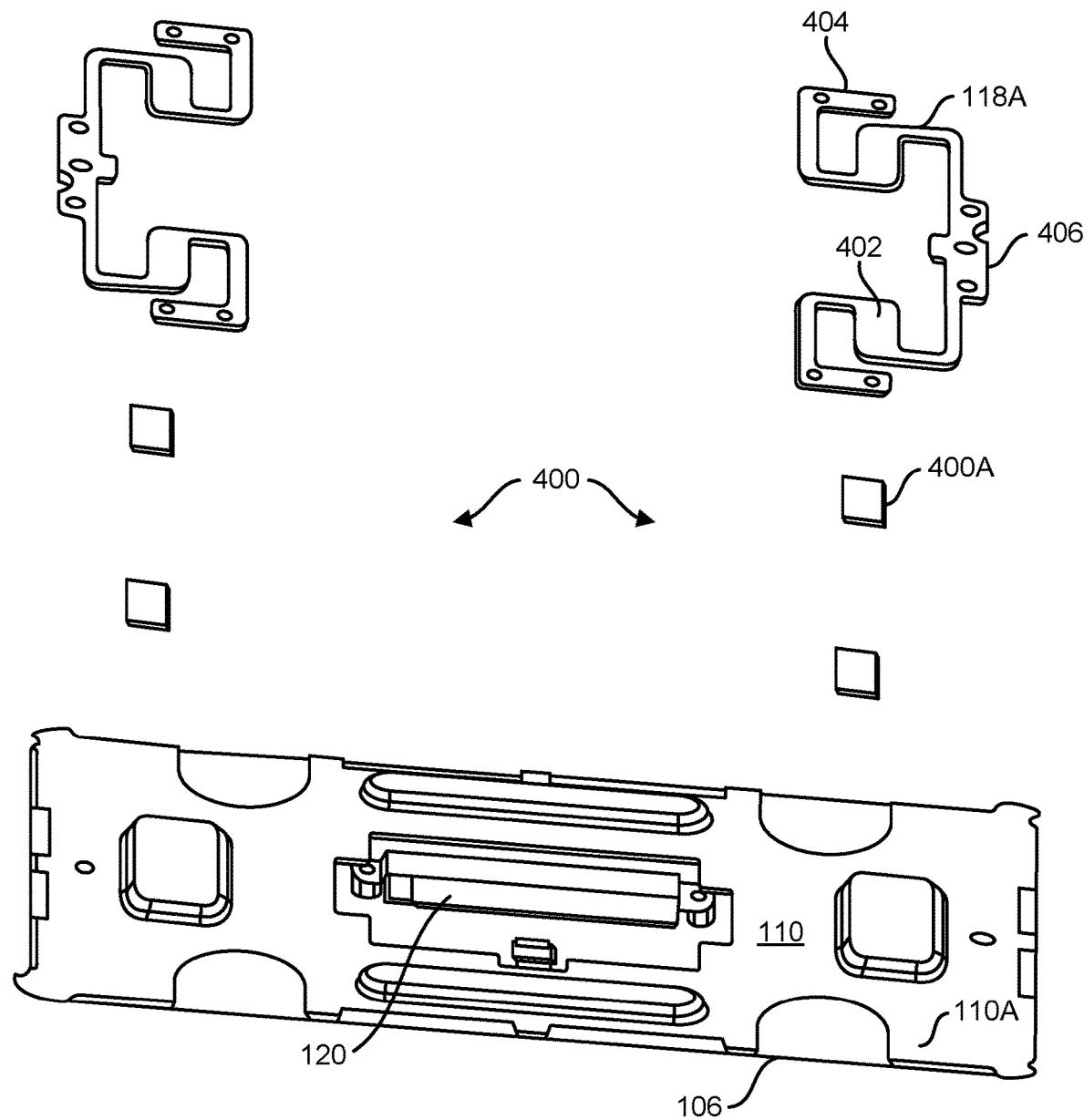
FIG. 4 shows an exploded view of the trackpad assembly of FIG. 3.

FIG. 4 shows an exploded view of the trackpad assembly 304 of FIG. 3. One or more compliant members can be provided as an interface between the spring 118A and a remainder of the trackpad assembly 304, such as the stiffener plate 110. In some implementations, foam 400 can be provided. For example, a foam 400A can be positioned between an area 110A of the stiffener plate 110 and a bias portion 402 of the spring 118A. That is, the bias portion 402 may be the only portion of the spring 118A that comes into contact with the foam 400A, and no portion of the spring 118A may directly contact the stiffener plate 110. The spring 118A may have fastening portions 404 and 406 that may be configured for attachment of the spring 118A to a portion of the device housing (e.g., to a target plate or to a laptop housing). For example, the fastener portion 404 and/or 406 may facilitate attachment by way of a fastener.

In some implementations, the spring 118A is configured to provide what may be referred to as z-dimension compliance for the trackpad assembly 304. The actuator 120 on the stiffener plate 110 may impart movement on the trackpad assembly (e.g., in form of haptic output) that occurs predominantly in one or more directions parallel to the plane of the stiffener plate 110. The direction(s) of such movement can be described as an x-direction. The movement resulting from force applied to the substrate, on the other hand—which may correspond to a user tapping or clicking on the surface of the substrate—can be described as occurring predominantly in a z-direction that is perpendicular to the x-direction. To provide z-dimension compliance (e.g., with regard to a push-force) may involve facilitating that the trackpad assembly 304 can move in the z-direction, relative to a remainder of the electronic device or other system, as a result of applied force.

In some implementations, the foam 400 is configured to provide what may be referred to as x-dimension compliance for the trackpad assembly 304. To facilitate x-dimension compliance may involve facilitating movement of the trackpad assembly 304 predominantly in the x-direction such as to propagate haptic output (e.g., from the actuator 120) to the substrate so it can be perceived tactilely by the user. As an illustrative example, it may be relatively easier to deform the foam 400 in the x-direction (e.g., by flexing and/or shearing) and relatively harder to deform the foam 400 in the z-direction (e.g., by compression or expansion).

In some implementations, the actuator 120 can be decoupled from the force sensing circuit that detects inductance in the trackpad assembly 304 (e.g., between a coil and a target plate or other part of a housing). In some implementations, the movement facilitated by the foam 400 and the movement facilitated by the spring 118A can be essentially perpendicular to each other. For example, a divergence of travel directions up to about a few degrees (including, but not limited to, five degrees) from orthogonality can be considered essentially perpendicular.

The foam 400 (e.g., the foam 400A) can be made from one or more suitable materials. In some implementations, a silicone foam and/or polyurethane can be used. For example, a silicone foam can be used to facilitate that the foam 400 provides x-direction compliance. The selection of a material for the foam 400 can be done so as to improve (e.g., optimize) a frequency mode for movement in the z-direction versus movement in the x-direction. The foam 400A can be attached to the spring 118A and/or to the stiffener plate 110 by way of an adhesive. For example, a pressure-sensitive adhesive and/or liquid glue (e.g., silicone epoxy) can be used.

Figure 5:
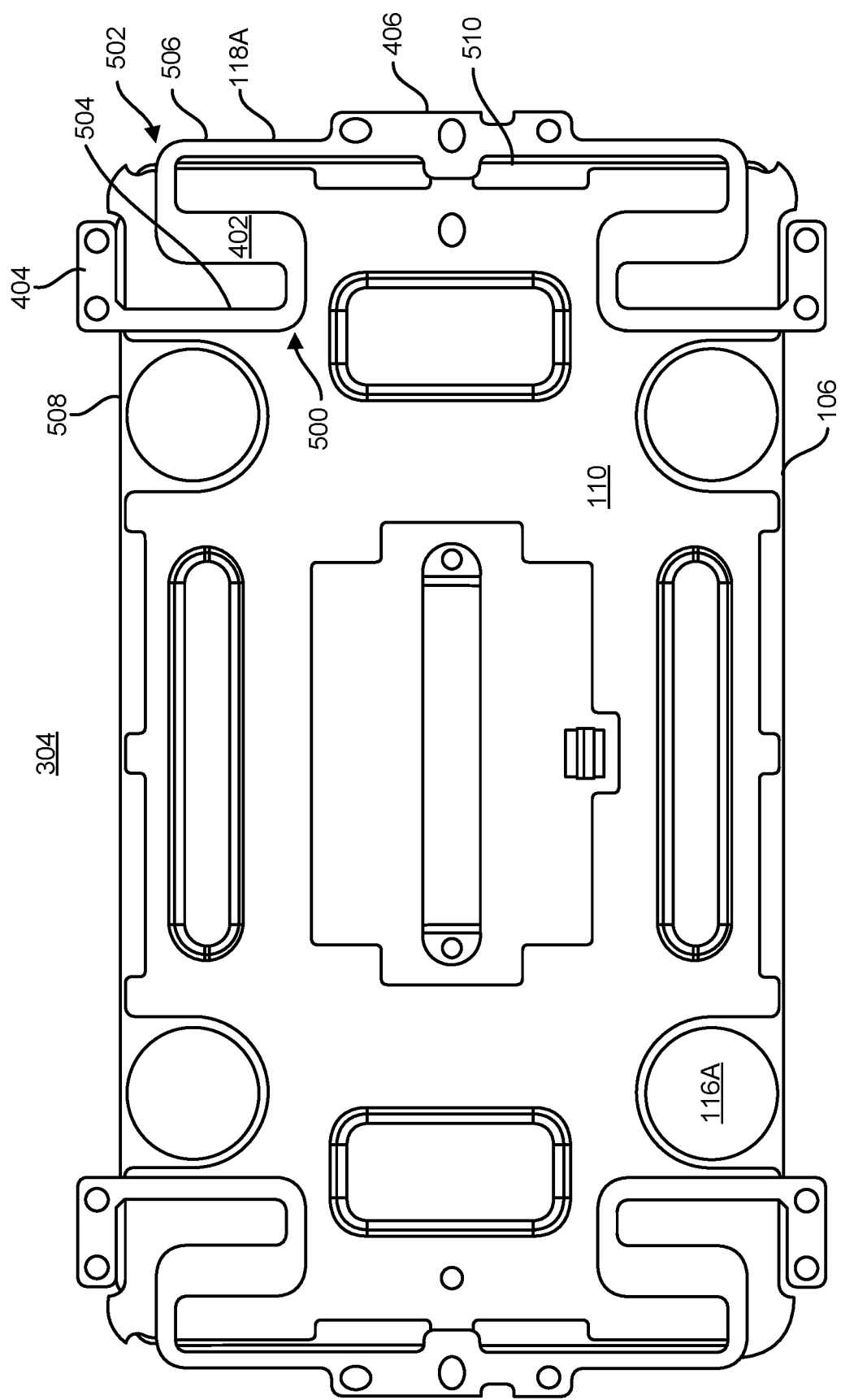
FIG. 5 shows a planar view of the trackpad assembly of FIG. 3.

FIG. 5 shows a planar view of the trackpad assembly 304 of FIG. 3. The spring 118A here includes the fastening portions 404 and 406, and the bias portion 402. The bias portion 402 is here located between the fastening portions 404 and 406. The spring 118A can include a 180-degree turn 500 between the bias portion 402 and the fastening portion 404. The spring 118A can include a 180-degree turn 502 between the bias portion 402 and the fastening portion 406. The spring 118A can include a connection 504 between the bias portion 402 and the fastening portion 404. The bias portion 402 can be wider than the connection 504. The spring 118A can include a connection 506 between the bias portion 402 and the fastening portion 406. The bias portion 402 can be wider than the connection 506. The connection 504, the 180-degree turn 500, the bias portion 402, the 180-degree turn 502, the connection 506 and the fastening portion 406 can form essentially an S-shape. Accordingly, the spring 118A can be S-shaped across the fastening portion 404, the bias portion 402, and the fastening portion 406. The stiffening plate 110 can have edges 508 and 510. In some implementations, the edges 508 and 510 are adjacent to each other. In some implementations, the edges 508 and 510 are perpendicular to each other. For example, the fastening portion 404 of the spring 118A can be aligned with the edge 508. For example, the fastening portion 406 of the spring 118A can be aligned with the edge 510. As such, each of the fastening portions 404 and 406 can be aligned with a respective edge of the stiffening plate 110, the edges 508 and 510 adjacent and perpendicular to each other.

Figure 6:
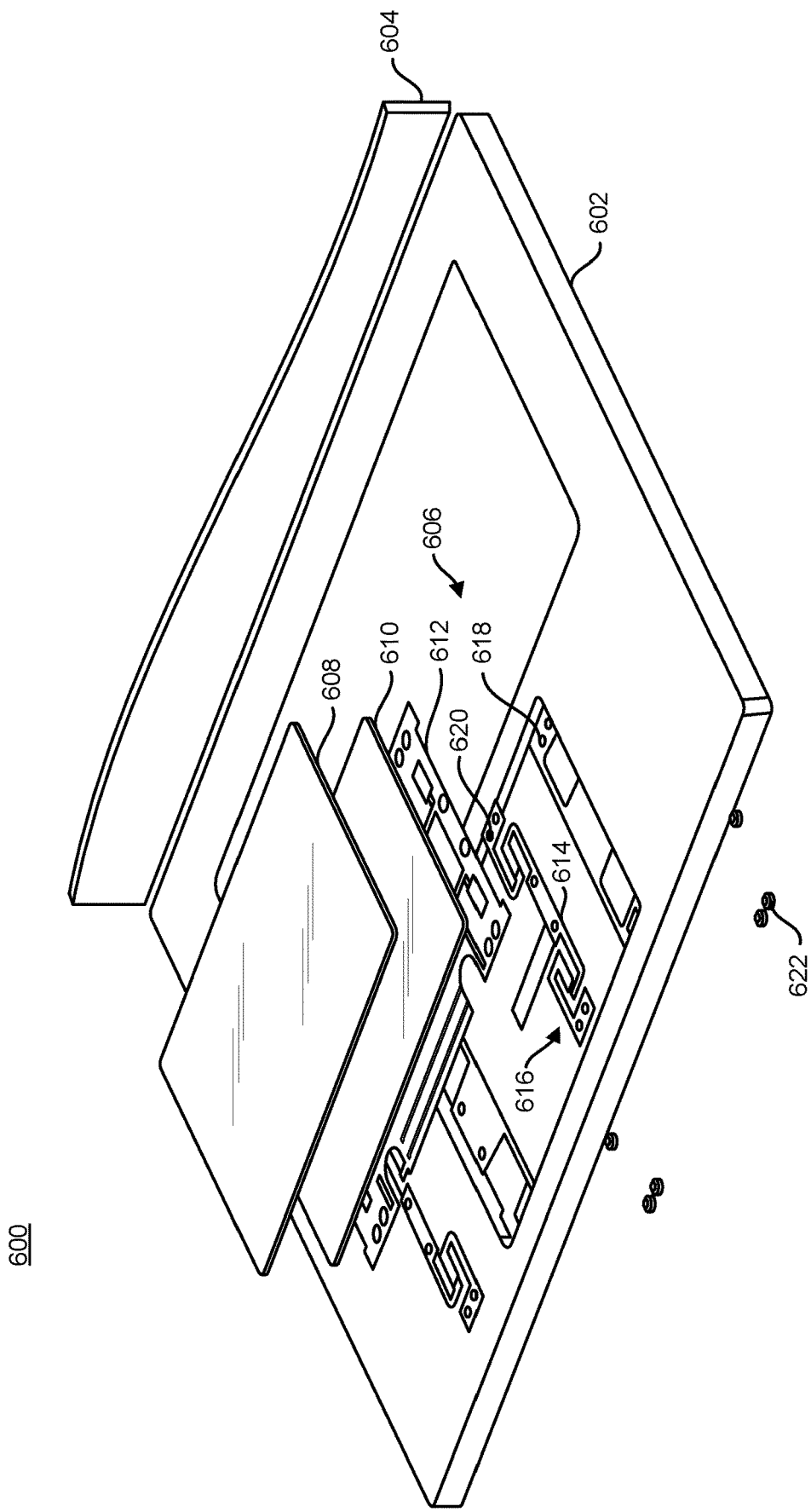
FIG. 6 shows an exploded view of an electronic device.

FIG. 6 shows an exploded view of an electronic device 600. The electronic device 600 can be used with one or more other examples described elsewhere herein. The electronic device 600 can be implemented using one or more examples described with reference to FIG. 17. The electronic device 600 can include a portion 602 and a portion 604 joined to each other. In some implementations, the joint includes a hinge to facilitate relative reorientation of one or both of the portions 602 and 604 relative to each other. For example, the portion 602 can be considered a base portion and can include processing components such as a motherboard, a hard drive, a keyboard, a power supply, and/or one or more optical drive units. For example, the portion 604 can be considered a lid portion and can include a display screen (e.g., a touchscreen), an antenna, a camera, and/or one or more speakers.

The electronic device 600 can include a trackpad 606 (e.g., according to the trackpad architecture 100 in FIGS. 1 and 2 or the trackpad architecture 300 in FIGS. 3 to 5) that can include a substrate (e.g., the substrate 102), a circuit board 610 (e.g., the circuit board 106), a stiffener plate 612 (e.g., the stiffener plate 110), and a spring 614 (e.g., the spring 118A). The portion 602 can be configured with an opening 616 to accommodate some or all of the trackpad 606. For example, the trackpad 606 can be mounted at the opening 616 so that at least the substrate 608 is facing toward a user (i.e., away from the opening 616, which may be characterized as an upward direction). The opening 616 may feature one or more opening 618. In some implementations, the spring 614 has one or more openings 620 that corresponds to, and is configured to align with, the opening 618. This can facilitate mounting of the trackpad 606 at the opening 616 so as to be attached to the portion 602. For example, one or more fasteners 622 (e.g., a bolt or screw) can be used to engage the openings 618 and 620 with each other. The opening(s) 618 can be formed in the housing (e.g., the main part) of the portion 602, or in a separation component attached to the portion 602 (e.g., a target plate), to name just two examples.

Figure 7:
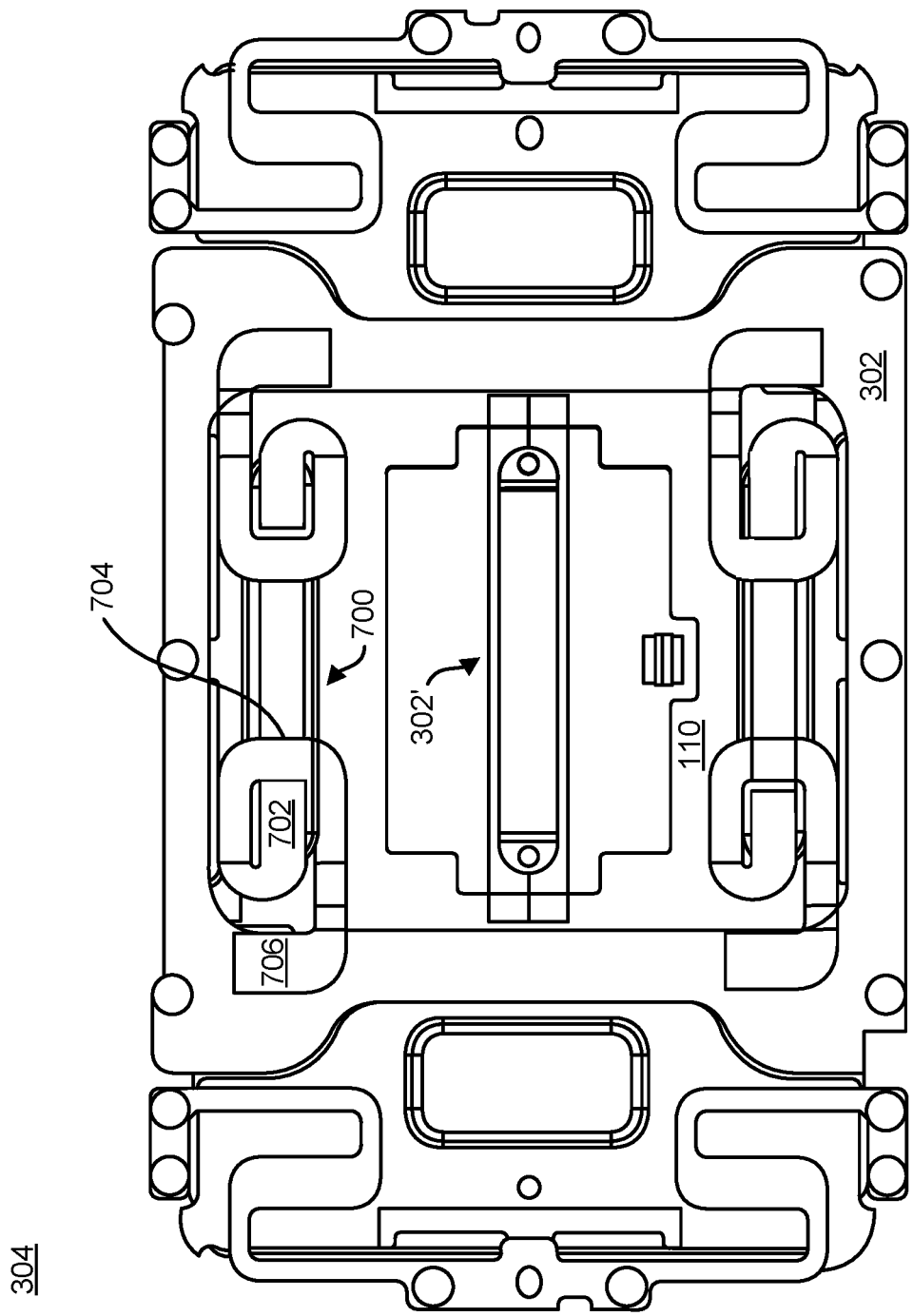
FIG. 7 shows a planar view of the trackpad assembly of FIG. 3 with the target plate.

FIG. 7 shows a planar view of the trackpad assembly 304 of FIG. 3 with the target plate 302. The target plate 302 can form part of a force sensing circuit that is configured for sensing force by way of detecting inductance and/or a change in inductance. Another part of such force sensing circuit can be an inductive component (e.g., a coil) that can be located on a circuit board of the trackpad assembly 304.

The trackpad assembly 304 can have one or more features to facilitate charge transfer and/or redistribution. It may be advantageous to provide electrical contact (e.g., grounding) between the stiffener plate 110 and the target plate 302. For example, this can allow excess charges at the circuit board (which may be electrically coupled to the stiffener plate; see, e.g., the grounding element 114A in FIG. 1). Here, the trackpad assembly 304 includes four (as an example) instances of a grounding element 700 that electrically connects the stiffener plate 110 and the target plate 302 to each other. In some implementations, the grounding element 700 can increase the protection against ESD for the circuit board and its components. For example, when the target plate 302 includes an electrically conductive material and is electrically in contact with the housing, the grounding element(s) 700 can provide an electrically conductive path between the stiffener plate 110 and the target plate 302. In some implementations, the target plate 302 can be a part of the housing.

The grounding element 700 can include a portion 702 (e.g., a substantially rectangular portion) configured to be coupled to the stiffener plate 110 (e.g., to an elevated portion of the stiffener plate 110 configured to protrude into or beyond the opening 302' of the target plate 302. The grounding element 700 can include a portion 704 extending to and from the portion 702. For example, the portion 704 can have a predominantly spiral-shaped configuration. The grounding element 700 can include a portion 706 configured for coupling to the target plate 302. During application of force to the substrate, the distance between the stiffener plate 110 and the target plate 302 can vary, and the design of a grounding element such as the grounding element 700 can facilitate that electrical contact is maintained between the stiffener plate 110 and the target plate 302. The portion 704 can undergo essentially a 360-degree turn between the portion 702 and the portion 706. For example, a spiral shape of the portion 704 can accommodate a relative change in position in the z-direction between the portions 702 and 706 (e.g., upon the portion 702 moving closer toward the portion 706). The grounding element 700 can be made of any suitable electrically conductive material. In some implementations, a conductive foil (e.g., a grounding tape) can be used.

Figure 8:
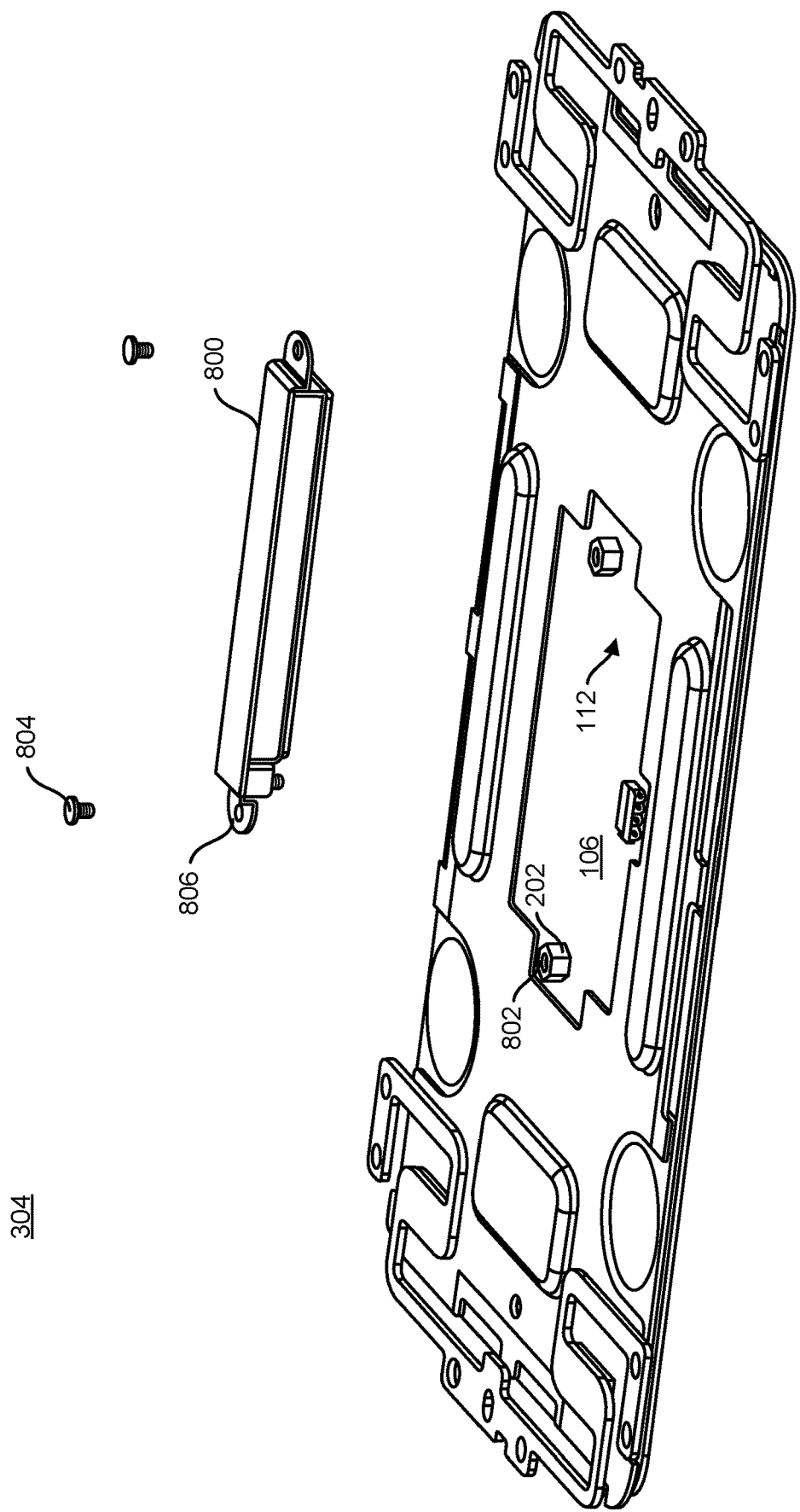
FIG. 8 shows an exploded view of the trackpad assembly of FIG. 3 with an actuator.

FIG. 8 shows an exploded view of the trackpad assembly 304 of FIG. 3 with an actuator 800. The circuit board 106 can have at least one of the self-clinching nut 202 mounted thereon. The self-clinching nut 202 can be mounted to the circuit board 106 using any appropriate technique. In some implementations, a surface mount technique can be used. For example, solder pads may be provided that engage in a reflow process in an oven at high temperature, which can fix the self-clinching nut 202 in place on the circuit board 106. The self-clinching nut 202 can provide an opening 802 that has inwardly facing threads. In some implementations, a fastener 804 (e.g., a bolt or screw) can serve to engage with the threads of the opening 802 in the self-clinching nut 202 so as to secure the actuator 800 to the circuit board 106. For example, the actuator 800 can have an opening 806 with which at least one of the fastener 804 or the self-clinching nut 202 engages. Any suitable type of actuator can be used for the actuator 800. In some implementations, an electronic actuator is used. For example, the electronic actuator can be a linear resonant actuator configured for reciprocating motion upon being actuated.

The use of the self-clinching nut 202 to attach the actuator 800 can provide an advantage over one or more other approaches, such as to use an adhesive (e.g., a pressure-sensitive adhesive). Adhesives can lead to relatively large unit-to-unit variations. Namely, when an adhesive is used, the adhesive is the only way in which vibrations are transferred from the actuator 800 to the circuit board 106 (and from there to the substrate, for perception by the user). When the adhesive is being applied, it may be a squishy, somewhat compressible substance, which can cause the thickness or other structural property of the adhesive layer to differ between assembled units. Also, an adhesive layer may be more susceptible to damages from external impact, such as if the electronic device is dropped. Accordingly, the use of the self-clinching nut 202 can provide a solution more robust against mechanical perturbations.

The circuit board 106 can be made according to existing techniques. In some implementations, the circuit board 106 includes a PCBA. For example, the PCBA can include one or more solder mask layer. For example, the solder mask layer can include polymer (e.g., a lacquer-like material) to protect the PCBA. The PCBA can include one or more signal/foil layer. The signal/foil layer can include a conductive material (e.g., copper) to facilitate signals or other electric transmissions in the PCBA. The PCBA can include one or more pre-preg layer. The pre-preg layer can include a polymer material (e.g., epoxy) at which conductive components in the PCBA (e.g., the signal/foil layer) are situated. The PCBA can include one or more plane/core layer. The plane/core layer can include a substrate (e.g., a metal sheet) forming the core of the PCBA.

Figure 9:
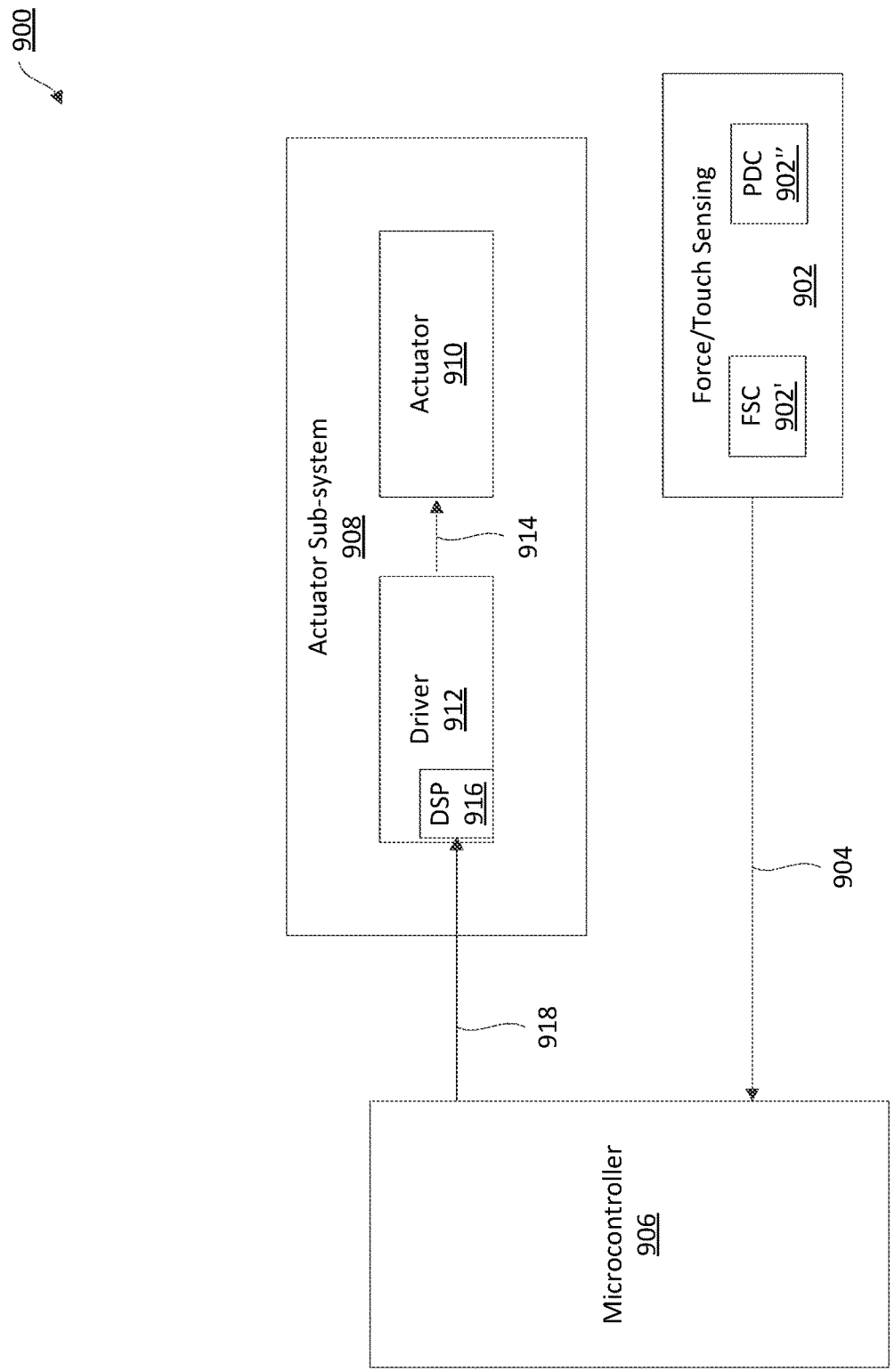
FIG. 9 schematically shows a computer system that provides force and touch sensing.

FIG. 9 schematically shows a computer system 900 that provides sensing of force and touch, and may provide haptic output. The computer system 900 can be used with one or more other examples described herein. For example, the computer system 900 can be implemented according to one or more examples described with reference to FIG. 17 below. Components of the computer system 900 can operate identically or similarly to corresponding components described in other examples herein. One or more of the components of the computer system 900 can be implemented as separate unit, or as part of an integrated unit together with at least one component.

The computer system 900 includes a force/touch sensing component 902. In some implementations, the force/touch sensing component 902 facilitates the user making inputs by either making a gesture (e.g., by sliding an object along the surface) or by applying force (e.g., by pressing with an object). The sensing of touch (e.g., by a capacitive and/or resistive array) can be separate (e.g., decoupled) from the sensing of force (e.g., by inductive measurement). In some implementations, the force/touch sensing component 902 can include circuitry configured for performing the sensing of force and/or touch. Here, the force/touch sensing component 902 includes a force sensing circuitry 902' and a position detecting circuitry 902". For example, the force sensing circuitry 902' can include a circuit of a voltage source and a resistor and/or capacitor. For example, the position detecting circuitry 902" can be based on capacitive sensing and include an array of conductors configured for detection of the increased capacitance due to a present object. As another example, the position detecting circuitry 902" can be based on resistive sensing and include an array of conductors configured for detection of the change in resistance due to an object touching the substrate. The force/touch sensing component 902 is coupled to one or more other aspects of the computer system 900, and such input(s) to the force/touch sensing component 902 can trigger generating of at least one signal 904. For example, the signal 904 represents, or may otherwise characterize, the gesture and/or force that was input using the force/touch sensing component 902. In some implementations, the computer system 900 can form, or be a part of, a force sensing circuit.

The computer system 900 includes a microcontroller 906. The microcontroller 906 includes at least: one or more processor cores, one or more memories, and one or more input/output components that allow the microcontroller 906 to communicate with other aspects of the computer system 900. In some implementations, the microcontroller 906 is implemented as part of a PCB/PCBA in an electronic device. For example, the microcontroller 906 can be mounted on a trackpad that is configured for providing haptic output.

In some implementations, the microcontroller 906 can be characterized as an "always-on processor." For example, the microcontroller 906 can always be receptive to inputs using the force/touch sensing component 902 regardless of the state of the computer system 900 or the state of the electronic device where the computer system 900 may be implemented.

The microcontroller 906 can perform functions regarding sensing of force. In some implementations, the microcontroller 906 senses the inductance relating to an inductive component on a circuit board and detects applied force accordingly. For example, a difference in inductance corresponding to a change in relative position between the inductive component and another component (e.g., a target plate or the housing, or another conductive component) can be detected. The microcontroller 906 can perform one or more actions in response to detection of force. One or more operations can be performed or inhibited, an output (e.g., visual and/or audio output) can be generated, information can be stored or erased, to name just a few examples.

The microcontroller 906 can perform functions regarding the control and provision of haptic output. In some implementations, the microcontroller 906 can facilitate user configuration of the haptic output to provide an increased level of customization. The computer system 900 includes an actuator sub-system 908 that includes an actuator 910 and a driver 912 coupled to the actuator 910. The actuator sub-system 908 can be coupled to the microcontroller 906 (e.g., by one or more bus connections) and can be configured for providing haptic output. The actuator 910 is coupled to a trackpad (see, e.g., trackpad architecture 100 in FIGS. 1 and 2 or trackpad architecture 300 in FIGS. 3 to 5, 7, and 8) and can be configured to undergo mechanical motion that impacts the trackpad so as to be perceptible to a user. In some implementations, the actuator 910 is an electromagnetic actuator. For example, the actuator 910 can be a linear resonant actuator. The actuator 910 operates based on at least one trackpad driver signal 914 that the driver 912 provides to the actuator 910. The trackpad driver signal 914 includes one or more electromagnetic waveforms that cause current(s) to flow through, and voltage(s) to be applied across, the actuator 910. The driver 912 can include one or more circuits and/or other components to control the actuator 910. The microcontroller 906 can trigger the driver 912 to perform operations. The microcontroller 906 can be configured to trigger the driver 912 to generate the trackpad driver signal 914 and to provide the trackpad driver signal 914 to the actuator 910.

The operation of the driver 912 can be facilitated by at least one digital signal processor (DSP) 916. The DSP 916 for the driver 912 can be mounted on the driver 912. For example, the DSP 916 can be implemented as part of the PCB 106 (FIG. 1). The DSP 916 can be coupled to the microcontroller 906, for example by a bus connection. The DSP 916 can instruct the driver 912 as to the trackpad driver signal 914 that is to be generated, and the driver 912 executes that instruction by controlling the operation of the actuator 910 in accordance with the trackpad driver signal 914. The driver 912 and/or the DSP 916 can receive at least one signal 918 from the microcontroller 906 and can operate based on, and in accordance with, the signal(s) 918.

Figure 10:
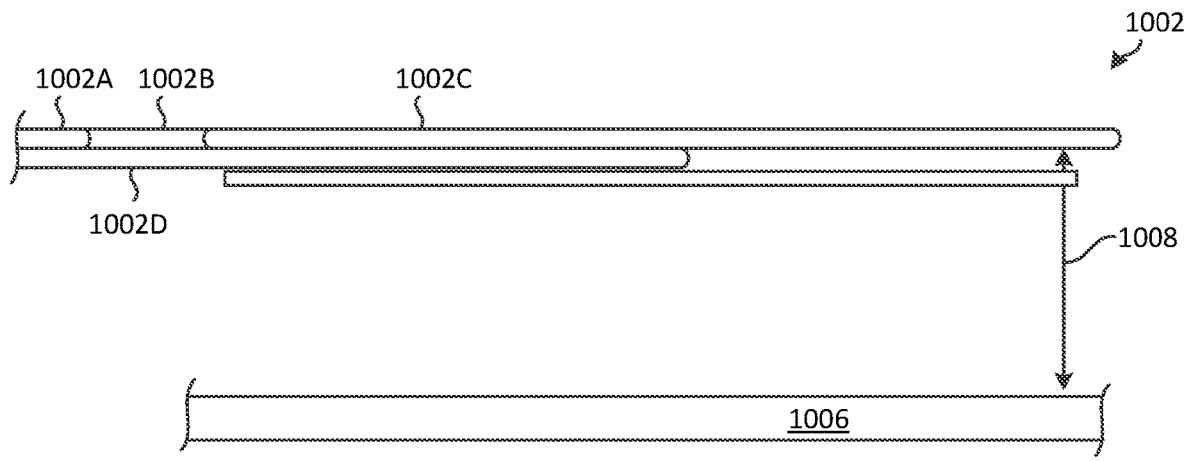
FIG. 10 schematically shows a side view of part of a trackpad to exemplify force sensing by inductive measurement.

FIG. 10 schematically shows a side view of part of a trackpad 1000 to exemplify force sensing by inductive measurement. The trackpad 1000 can be used with one or more other examples described herein. For example, the trackpad 1000 can be implemented in one or more of the devices described with reference to FIG. 17 below. The trackpad 1000 includes an inductive element 1002, a protective layer 1004, and a target plate 1006. Some components have been omitted for purposes of clarity (including, but not limited to, a circuit board and a substrate). The target plate 1006 can be a separate component, or can be a portion of another component, including, but not limited to, a housing or other body of an electronic device where the trackpad 1000 is implemented.

The inductive element 1002 includes a connector 1002A, which makes a turn and forms a portion 1002B, a spiral portion 1002C, and a connector 1002D. The connectors 1002A and 1002D can serve to connect the inductive element 1002 to another component (not shown). For example, the connector 1002D can originate in the center of the spiral portion 1002C and extend toward the connector 1002A. The connectors 1002A and 1002D are electrically isolated from each other. One of the connectors 1002A and 1002D can be considered as forming the beginning of the inductive element 1002, and the other of the connectors 1002A and 1002D can be considered as forming the end of the inductive element 1002. The inductive element 1002 can be made from any suitable electrically conductive material. In some implementations, the inductive element 1002 is formed from a material associated with the circuit board. For example, the inductive element 1002 can be formed from copper trace as part of the process of fabricating or otherwise manufacturing the circuit board. More than one inductive element can be formed on a circuit board. For example, multiple inductive elements may be substantially identical to each other in design, or two or more inductive elements may have different geometries.

In some implementations, the connectors 1002A and 1002D can connect the inductive element 1002 to a remainder of a force sensing circuit. For example, alternating current (AC) can be applied to the inductive element 1002 by way of the connectors 1002A and 1002D. The protective layer 1004 can serve as protection for the inductive element 1002. For example, the protective layer 1004 can include a substantially non-inductive material that covers the inductive element 1002 from contamination or other interference.

The trackpad 1000 can include the inductive element 1002 to provide an inductive sensing mechanism for force detection. In operation, an AC field can be generated by the inductive element 1002. The AC field can induce eddy currents in or on the target plate 1006. The eddy currents give rise to a magnetic field that opposes the magnetic field of the inductive element 1002. Particularly, the reduction of the inductance can depend on a distance 1008 between the inductive element 1002 and the target plate 1006. The distance 1008 can represent a nominal gap that has a predetermined length (e.g., within a certain tolerance) at the time of assembly or calibration. As such, when the distance 1008 changes—such as due to a force being applied to the substrate of the trackpad 1000—the force sensing circuit can sense the force by way of detecting the change in inductance. The trackpad 1000 provides a contactless sensing system that can offer good reliability, be insensitive to environmental contaminants, offer high sensing resolution, and/or provide a cost-effective solution. The geometry of the inductive element 1002 (e.g., of the connector 1002A, the portion 1002B, the spiral portion 1002C, and/or the connector 1002D) can be altered to effectuate scaling of the design solution.

Figure 11A:
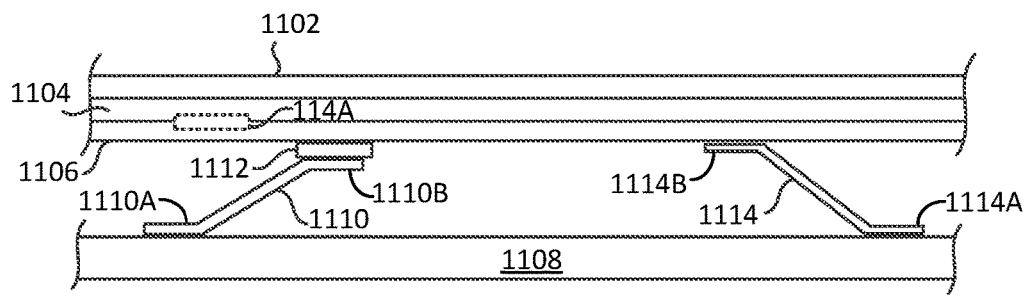
FIGS. 11A-B schematically show a side view of part of a trackpad to illustrate spring action and grounding.
Figure 11B:
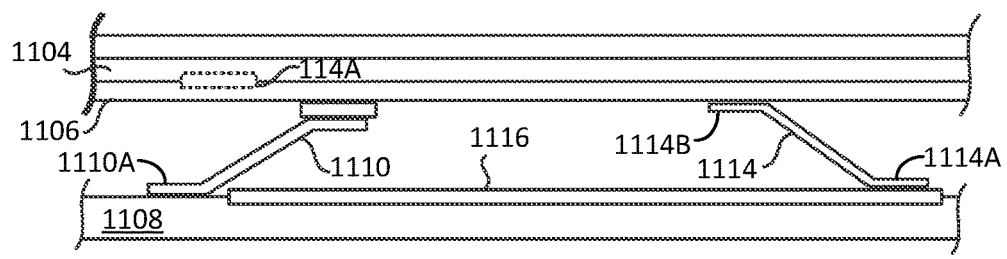

FIGS. 11A-B schematically show a side view of part of a trackpad 1100 to illustrate spring action and grounding. The trackpad 1100 can be used with one or more other examples described herein. For example, the trackpad 1100 can be implemented in one or more of the devices described with reference to FIG. 17 below. Some components have been omitted for purposes of clarity (including, but not limited to, an inductive component and intermediate layers).

The trackpad 1100 includes a substrate 1102 (e.g., the substrate 102 in FIG. 1 and FIG. 3), a circuit board 1104 (e.g., the circuit board 106 in FIG. 1 and FIG. 3), a stiffener plate 1106 (e.g., the stiffener plate 110 in FIG. 1 and FIG. 3), and a housing 1108 (e.g., the housing of the electronic device 600 in FIG. 6). A spring 1110 has an end 1110A that abuts the housing 1108, and an end 1110B at the stiffener plate 1106. For example, a layer 1112 (e.g., a silicone foam, polyurethane foam, or other foam) can abut the stiffener plate 1106 and provide an interface for the end 1110B of the spring 1110. The spring 1110 can be made of any suitable material having sufficient flexibility and stiffness, including, but not limited to, a metal. The spring 1110 can be elastically deformed as a result of force being applied, providing a change in the distance between, on the one hand, the substrate 1102, the circuit board 1104, and the stiffener plate 1106, and on the other hand, the housing 1108.

The trackpad 1100 includes a conductive element 1114 that electrically couples the housing 1108 and the stiffener plate 1106 to each other. For example, this can provide grounding of one or more components on the circuit board 1104. The conductive element 1114 can have an end 1114A that abuts the housing 1108, and an end 1114B that abuts the stiffener plate 1106. The conductive element 1114 can be elastically deformed as a result of the change in the distance between, on the one hand, the substrate 1102, the circuit board 1104, and the stiffener plate 1106, and on the other hand, the housing 1108. As such, the conductive element 1114 can provide useful electric contact between the housing 1108 and the stiffener plate 1106 under a variety of operating conditions. The grounding element 114A, here schematically shown with a dashed outline, can be positioned between the circuit board 1104 and the stiffener plate 1106. For example, the grounding element 114A electrically connects the circuit board 1104 and the stiffener plate 1106 to each other.

In the example of FIG. 11A, the conductive element 1114 abuts the housing 1108 at the end 1110A. In the example of FIG. 11B, by contrast, a target plate 1116 (e.g., the target plate 302 in FIG. 3) is provided at the housing 1108. Here, the end 1114A of the conductive element 1114 can abut the target plate 1116 (which may be electrically coupled to the housing 1108, such as by a metal-to-metal surface contact). The end 1110A of the spring 1110, may directly abut the housing 1108 and may not abut the target plate 1116 in this example. The grounding element 114A, here schematically shown with a dashed outline, can be positioned between the circuit board 1104 and the stiffener plate 1106. For example, the grounding element 114A electrically connects the circuit board 1104 and the stiffener plate 1106 to each other.

Figure 12:
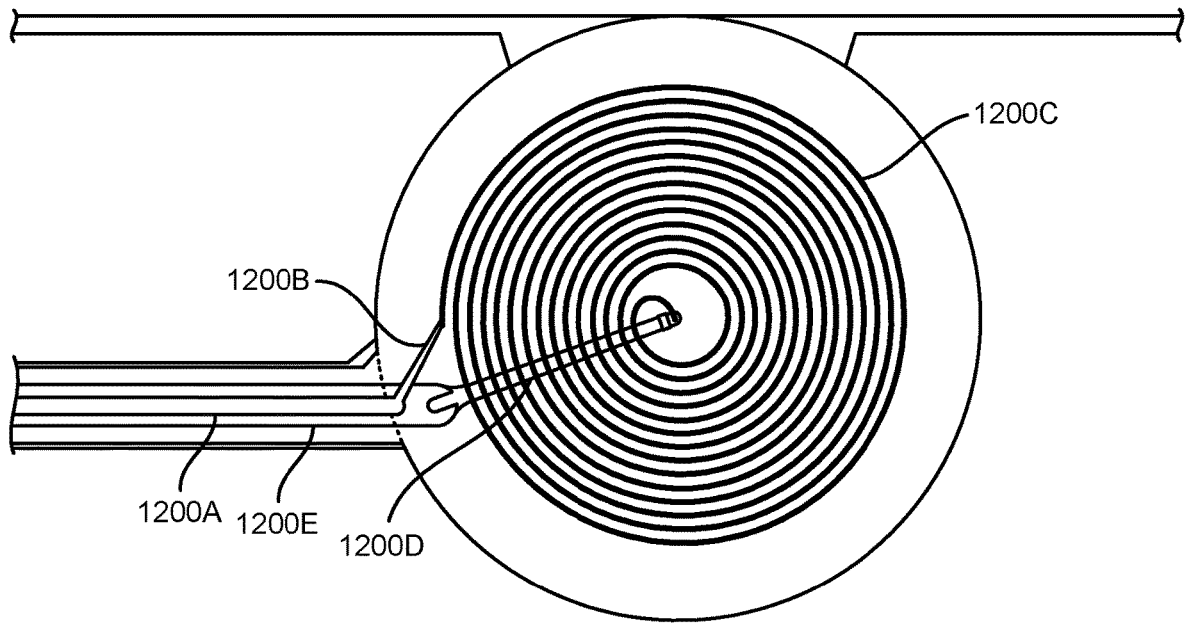
FIG. 12 shows an example of an inductive element.

FIG. 12 shows an example of an inductive element 1200. The inductive element 1200 is shown in a plan view. For example, the inductive element 1200 may be implemented on the surface (e.g., somewhat embedded into the surface) of a circuit board (not shown). The inductive element 1200 can be used with one or more other examples described herein, e.g., it can be used in connection with trackpad architecture 100 in FIGS. 1 and 2 or trackpad architecture 300 in FIGS. 3 to 5, 7, and 8. For example, the inductive element 1200 can be implemented in one or more of the devices described with reference to FIG. 17 below. Some components have been omitted for purposes of clarity (including, but not limited to, a circuit board and a stiffener board).

The inductive element 1200 includes a connector 1200A, which makes a turn and forms a portion 1200B, a spiral portion 1200C, a portion 1200D, and a connector 1200E. Compare, for example, with the description of the inductive element 1002 in FIG. 10. The connectors 1200A and 1200E can serve to connect the inductive element 1200 to another component (not shown). In some implementations, the connectors 1200A and 1200E can connect the inductive element 1200 to a remainder of a force sensing circuit. For example, AC can be applied to the inductive element 1200 by way of the connectors 1200A and 1200E. In some implementations, the inductive element 1200 can be fabricated directly on the circuit board. In some implementations, the inductive element 1220 can comprise a planar spiral. For example, the planar spiral can be positioned flat against a main surface of the circuit board. The geometry of the inductive element 1200 can be adjusted for different applications and/or to take into account different constraints on the implementation.

Figure 13B:
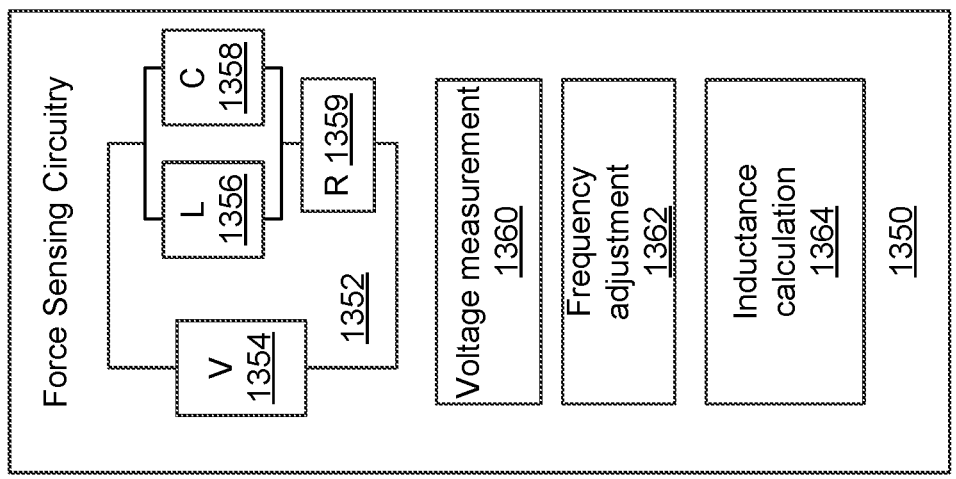
FIGS. 13A-B show examples of force sensing circuitry.
Figure 13A:
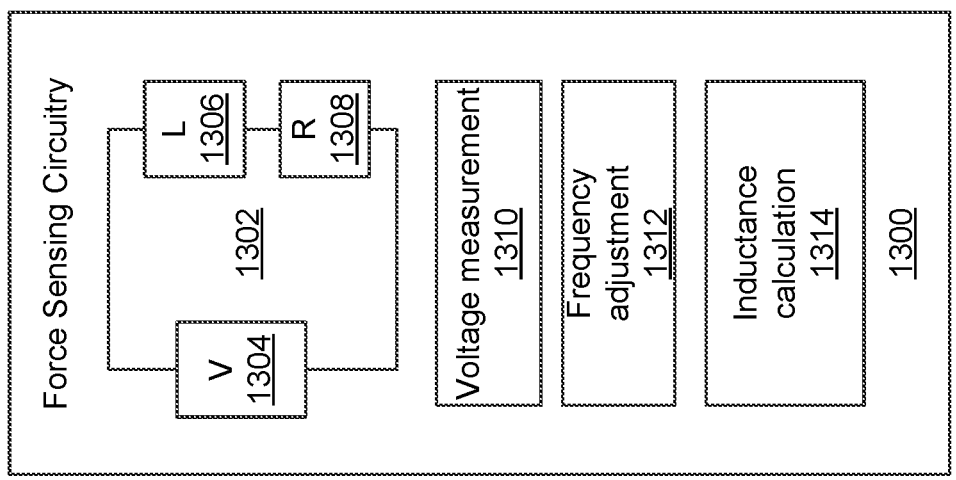

FIG. 13A shows an example of force sensing circuitry 1300. The force sensing circuitry 1300 can be used with one or more other examples described herein, e.g., it can be used in connection with trackpad architecture 100 in FIGS. 1 and 2, trackpad architecture 300 in FIGS. 3 to 5, 7, and 8, trackpad 1000 in FIG. 10 or trackpad 1100 in FIGS. 11A and 11B. The force sensing circuitry 1300 can be, or be used in, the force sensing circuitry 902' (FIG. 9). For example, the force sensing circuitry 1300 can be implemented in one or more of the devices described with reference to FIG. 17 below.

The force sensing circuitry 1300 includes a circuit 1302 that has at least a voltage source 1304 (labeled V), an inductance 1306 (labeled L), and a resistance 1308 (labeled R). The voltage source 1304, inductance 1306, and resistance 1308 are electrically connected to each other in series as indicated to complete the circuit 1302. The inductance 1306 is the inductance that is the subject of the force sensing (e.g., the (varying) inductance of the inductive element 1002 in FIG. 10). The resistance 1308 may be a known resistance.

For example, the resistance 1308 may be the resulting resistance of the component(s) located between the inductance 1306 and ground.

In operation, the voltage source 1304 may provide voltage to the circuit 1302 in form of AC. A voltage measurement component 1310 (e.g., one or more chips or other integrated circuit (IC) components), may measure voltage at the junction between the inductance 1306 and the resistance 1308. A frequency adjustment component 1312 (e.g., one or more chips or other IC components) can adjust the frequency of the voltage applied by voltage source 1304 until the measured voltage is half of the input voltage. An inductance calculation component 1314 (e.g., one or more chips or other IC components) can calculate the inductance 1306 as a function of the resistance 1308 and the adjusted frequency of the voltage source 1304. For example, the inductance 1306 may then be directly proportional to the resistance 1308 and inversely proportional to the frequency.

FIG. 13B shows an example of force sensing circuitry 1350. The force sensing circuitry 1350 can be used with one or more other examples described herein, e.g., it can be used in connection with trackpad architecture 100 in FIGS. 1 and 2, trackpad architecture 300 in FIGS. 3 to 5, 7, and 8, trackpad 1000 in FIG. 10 or trackpad 1100 in FIGS. 11A and 11B. For example, the force sensing circuitry 1350 can be implemented according to one or more examples described with reference to FIG. 17 below.

The force sensing circuitry 1350 includes a circuit 1352 that has at least a voltage source 1354, an inductance 1356, a capacitance 1358 (labeled R), and a resistance 1359. The inductance 1356 and the capacitance 1358 are coupled in parallel. The voltage source 1354, the parallel coupling of the inductance 1356 and the capacitance 1358, and the resistance 1359 are electrically connected to each other in series as indicated to complete the circuit 1352. The inductance 1356 is the inductance that is the subject of the force sensing (e.g., the (varying) inductance of the inductive element 1002 in FIG. 10). The capacitance 1358 may be a known capacitance. The resistance 1359 may be a known resistance. For example, the resistance 1359 may be the resulting resistance of the component(s) located between the parallel coupling of the inductance 1356 and the capacitance 1358 and ground.

In operation, the voltage source 1354 may provide voltage to the circuit 1352 in form of AC. A voltage measurement component 1360 (e.g., one or more chips or other integrated circuit (IC) components), may measure voltage at the junction between the resistance 1359 and the parallel coupling of the inductance 1356 and the capacitance 1358. A frequency adjustment component 1362 (e.g., one or more chips or other IC components) can adjust the frequency of the voltage applied by voltage source 1354 until the measured voltage shows a maximum response, corresponding to the resonant point of the parallel coupling of the inductance 1356 and the capacitance 1358. An inductance calculation component 1364 (e.g., one or more chips or other IC components) can calculate the inductance 1356 as a function of the capacitance 1358 and the adjusted frequency of the voltage source 1354. For example, the inductance 1356 may then be inversely proportional to both the capacitance 1358 and the frequency.

Figure 14:
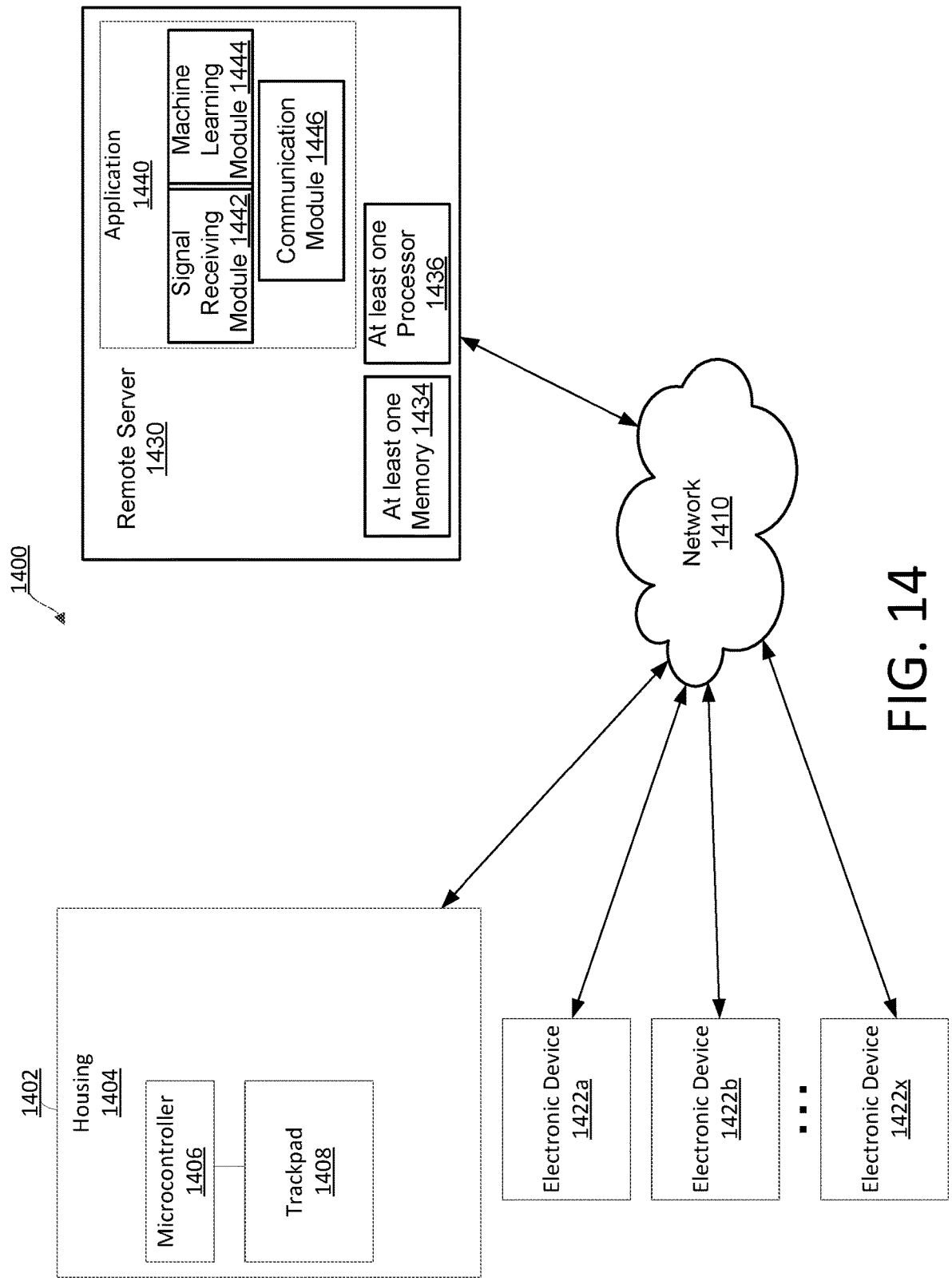
FIG. 14 schematically shows a computer system that provides earthquake detection.

FIG. 14 schematically shows a computer system 1400 that provides earthquake detection. In general, the system 1400 detects vibrations at multiple electronic devices 1402, 1422a-1422x using the trackpads on the electronic devices 1402, 1422a-1422x. If the electronic devices 1402, 1422a-1422x determine the vibrations are due to an earthquake, the individual electronic devices 1402, 1422a-1422x send an earthquake vibration signal to the remote server 1430 via the network 1410. The remote server 1430 aggregates the received earthquake vibration signals and determines if the aggregated earthquake vibration signals are indicative of an earthquake. If the remote server 1430 determines that the aggregated earthquake vibration signals are indicative of an earthquake, then the remote server 1430 sends an earthquake alert to the electronic devices 1402, 1422a-1422x. In some implementations, the remote server 1403 send the earthquake alert to other electronic devices (not shown) that may be in an area affected by the earthquake.

More specifically, the system 1400 includes multiple electronic devices (also referred to interchangeably as computing devices) 1402, 1422a-1422x. In the example figure, electronic device 1402 is illustrated with labeled components, while electronic devices 1422a-1422x are not for the sake of simplicity. It is understood that the electronic devices 1422a-1442x include the same components as electronic device 1402. It is also understood that electronic devices 1422a-1422x represent multiple electronic devices that could be hundreds, thousands, or millions of electronic devices. The electronic device 1402, as well as the electronic devices 1422a-1422x, includes a housing 1404, a microcontroller (or processor) 1406, and a trackpad 1408, in addition to other components, which are understood but not illustrated for the sake of simplicity. The housing 1404 houses the electronic components of the electronic device 1402 including the microcontroller 1406 and the trackpad 1408. In some implementations, the housing 1404 forms parts of the trackpad 1408 and functions as a target plate of the trackpad 1408, such as target plate 302 in the trackpad architecture 300 of FIG. 3 or the target plate 1006 in the trackpad 1000 of FIG. 10.

The trackpad 1408 may be implemented as any of the example implementations of trackpads, as discussed above. For example, the trackpad 1408 may be implemented and include all of the features, functionality and components of trackpad architecture 100 in FIGS. 1 and 2 or the trackpad architecture 300 in FIGS. 3 to 5, 7, and 8. In some implementations, the trackpad 1408 is configured to detect vibrations using the inductive element, such as the inductive element 1002 of FIG. 10 or the inductive element 1200 of FIG. 12, which may be implemented on a circuit board as part of the trackpad architecture 100 in FIGS. 1 and 2 or the trackpad architecture 300 in FIGS. 3 to 5, 7, and 8. The trackpad 1408 also uses force sensing circuitry in combination with the inductive element to detect vibrations. The force sensing circuitry includes the force sensing circuitry 1300 of FIG. 13, which can be used with one or more other examples described herein, e.g., it can be used in connection with trackpad architecture 100 in FIGS. 1 and 2, trackpad architecture 300 in FIGS. 3 to 5, 7, and 8, trackpad 1000 in FIG. 10 or trackpad 1100 in FIGS. 11A and 11B. The force sensing circuitry 1300 can be, or be used in, the force sensing circuitry 902' of FIG. 9.

In some implementations, the trackpad 1408 is configured to detect the vibrations by measuring a change in distance in a gap between the inductive element and the target plate of the trackpad 1408. For example, referring back to FIG. 10, the trackpad 1408 can include an inductive element to provide an inductive sensing mechanism for vibration detection. In contrast to the example of FIG. 10, where a force on the substrate changes the distance 1008, the vibrations change the distance by the target plate moving up and down, while the substrate remains consistent from inertia. Thus, vibrations can cause the distance 1008 to change and to induce a force through the change in inductance, as described above in detail with respect to FIG. 10.

The microcontroller 1406 is configured to process the vibrations for detection of an earthquake vibration signal. The microcontroller 1406 detects and/or generates the earthquake vibration signal when vibrations are detected through the change in inductance due to a change in the distance in the gap that exceed a threshold vibration level and no touch input is registered and the electronic device is being charged. In this manner, when the criteria of no touch input is detected on the trackpad, the electronic device is being charged, and the detected vibrations exceed a threshold vibration level, then the microcontroller 1406 generates the earthquake vibration signal. In response to detecting the earthquake vibration signal, the microcontroller 1406 communicates the earthquake vibration signal to the remote server 1430 via the network 1410. The earthquake vibration signal that is communicated to the remote server 1430 includes the raw data from the inductive element, a location of the computing device 1402, and a timestamp for when the vibrations were detected by the trackpad 1408.

The remote server 1430 is a computing device that includes at least one memory 1434, at least one processor 1436, and an application 1440. The at least one memory 1434 include instructions and the at least one processor 1436 is operably coupled to the at least one memory 1434 and configured to execute the instructions. The instructions, when executed, cause the at least one processor 1436 to implement the application 1440. The application 1440 is configured to receive, aggregate, and process the earthquake vibration signals received from multiple computing devices 1402, 1422a-1422x.

The application 1440 includes a signal receiving module 1442 that is configured to receive multiple earthquake vibration signals generated from multiple computing devices through vibrations detected on trackpads of the computing devices. The signal receiving module 1442 also aggregates the earthquake vibration signals and inputs the aggregated earthquake vibration signals into a machine learning module 1444. The location information and timestamp information that are part of the earthquake vibration signals can be used to extract and aggregate common signals for a certain area.

The machine learning module 1444 is configured to process the aggregated vibration signals to detect an earthquake in a location. In some implementations, the machine learning module 1444 is a trained neural network that is configured to process the earthquake vibrations signals to determine whether or not the aggregated signals are or are not related to an earthquake. The machine learning module 1444 includes a detection algorithm that uses the signals from a plurality, in particular a large quantity of computing devices to determine if the signals are indicative of an actual earthquake. The machine learning module 1444 may be trained using known earthquake vibration signals having known outcomes of whether the aggregated signals matched with an actual earthquake. In this manner, when aggregated earthquake vibration signals without known outcomes are processed by the trained machine learning module 1444, then the machine learning module 1444 can determine whether or not those aggregated earthquake vibration signals indicate an actual earthquake in a particular location. By using the machine learning module 1444, it is possible to process signals from a large number of computing devices in a short timeframe.

The machine learning module 1444 includes one or more algorithms to reject false-positives. For example, the machine learning module 1444 may determine that the electronic device is being picked up based on the data from the inductive element having a step-like function instead of periodic vibrations. This determination results in no earthquake alert being communicated to the computing devices. The machine learning module 1444 also may determine that incoming simultaneous earthquake vibration signals from devices that are in essentially the same location may be a false positive. For instance, the computing devices all may have received an incoming message at a same time that caused the devices to vibrate.

When the machine learning module 1444 detects an earthquake, the machine learning module 1444 triggers the communication module 1446 to send an earthquake alert. In some implementations, the communication module 1446 sends the earthquake alert to all of the computing devices 1402, 1422a-1422x that sent earthquake vibration signals to the remote server 1430. In some implementations, the communication module 1446 sends the earthquake alert to additional computing devices in an area that could be affected by the earthquake. The machine learning module 1444 may communicate the location information of the earthquake to the communication module 1444. The communication module 1444 may use the location information from the machine learning module 1444 and send out the earthquake alert to computing devices within a configurable radius of a center of the location of the computing devices.

Figure 15:
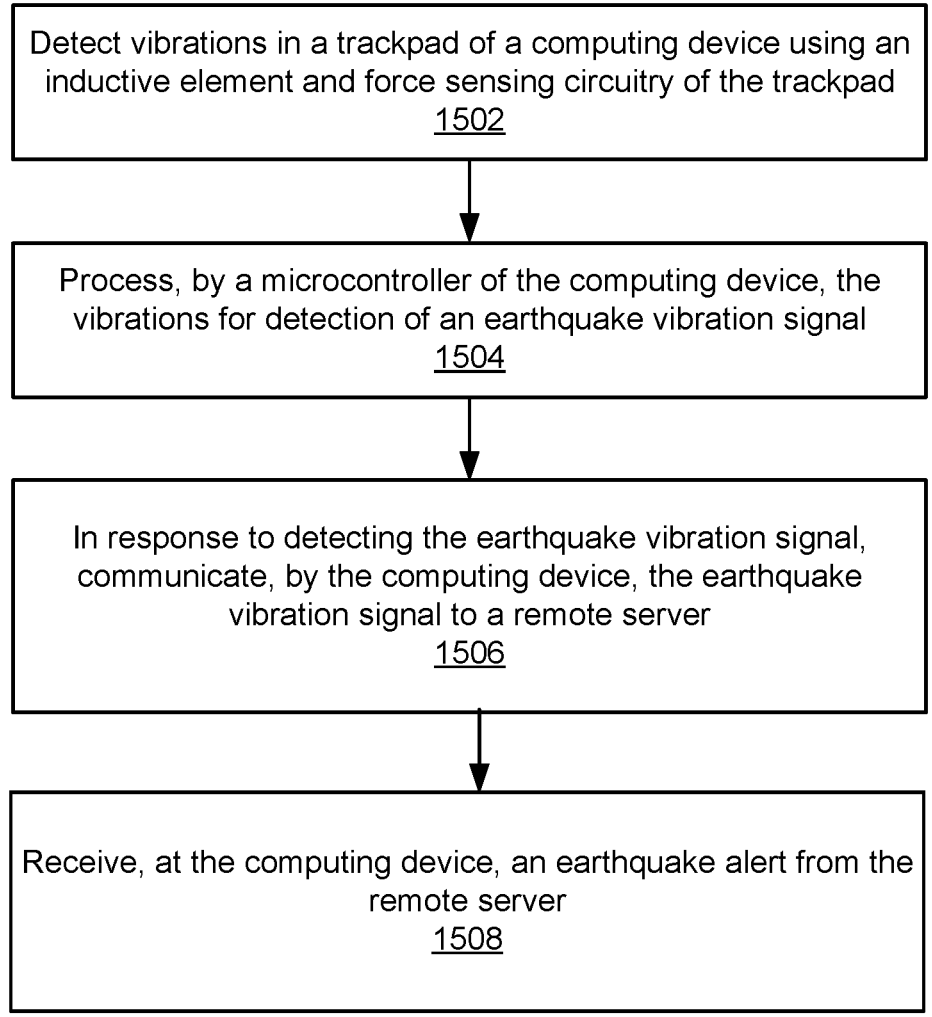
FIG. 15 illustrates an example process of the operations of the computer device in the computer system of FIG. 14.

Referring to FIG. 15, an example process 1500 illustrates example operations of the system 1400 from the perspective of the computing device 1402. Process 1500 describes example operations for detecting an earthquake. Process 1500 includes detecting vibrations in a trackpad of a computing device using an inductive element and force sensing circuitry of the trackpad (1502). For example, the trackpad 1408 in the electronic device 1402 may detect vibrations using the inductive element and the force sensing circuitry of the trackpad 1408. Detecting the vibrations in the trackpad of the computing device (1502) may include measuring a change in distance in a gap between the inductive element and a target plate of the trackpad. For example, the vibrations may be detected by measuring a change in distance in the gap between the inductive element and the target plate of the trackpad 1408, as discussed above. In some implementations, the target plate is a bottom of the housing 1404 of the electronic device 1402.

Process 1500 includes processing, by a microcontroller of the computing device, the vibrations for detection of an earthquake vibration signal (1504). For example, the microcontroller 1406 is configured to process the vibrations detected by the trackpad 1408 to detect the earthquake vibration signal. In some implementations, processing the vibrations for detection of the earthquake vibration signal includes determining no touch input was detected on the trackpad, determining the computing device is being charged, determining the vibrations exceed a threshold vibration level, and in response to these determinations, generating the earthquake vibration signal. The earthquake vibration signal includes data from the inductive element, a location of the computing device, and a timestamp of the detecting the vibrations.

Process 1500 includes in response to detecting the earthquake vibration signal, communicating, by the computing device, the earthquake vibration signal to a remote server (1506). For example, the computing device 1402 communicates the detected earthquake vibration signal to the remote server 1430.

Process 1500 includes receiving, at the computing device, an earthquake alert from the remote server (1508). For example, the computing device 1402 is configured to receive the earthquake alert from the remote server 1430. In some implementations, process 1500 further includes receiving a user feedback option enabling a response to the earthquake alert. For instance, the computing device 1402 may receive a user feedback option for display on the computing device 1402 that enables the user to provide feedback regarding the earthquake alert to the remote server 1403.

Figure 16:
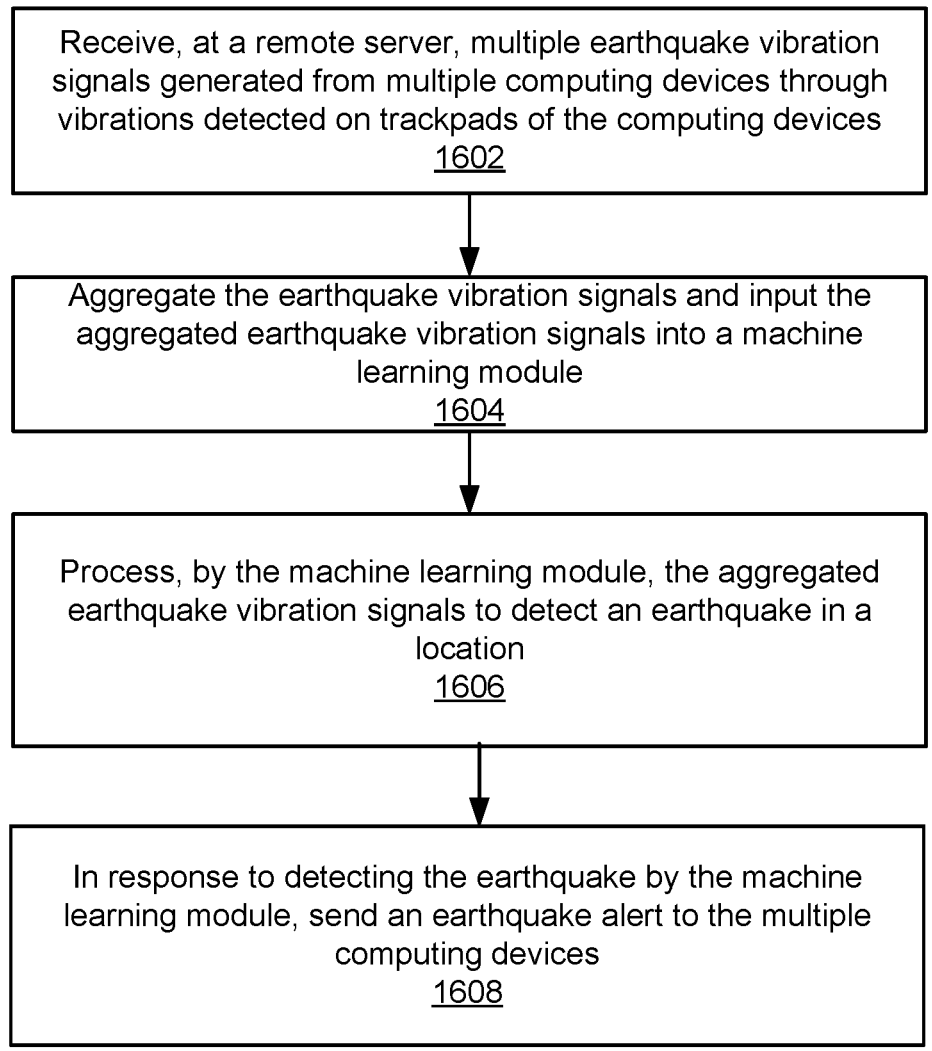
FIG. 16 illustrates an example process of the operations of the remote server in the computer system of FIG. 14.

Referring to FIG. 16, an example process 1600 illustrates example operations of the system 1400 from the perspective of the remote server 1430. Process 1600 describes example operations for detecting an earthquake. Process 1600 includes receiving, at a remote server, multiple earthquake vibration signals generated from multiple computing devices through vibrations detected on trackpads of the computing devices (1602). For example, the remote server 1430 is configured to receive multiple earthquake vibration signals generated from multiple computing devices 1402, 1422*a*-1422*x* through vibrations detected on the trackpads of the computing devices 1402, 1422*a*-1422*x*. Specifically, the signal receiving module 1442 of the application 1440 may receive the multiple earthquake vibration signals. As discussed above, the earthquake vibration signals include data from an inductive element in the trackpads of the computing devices 1402, 1422*a*-1422*x*, locations of the computing devices 1402, 1422*a*-1422*x*, and timestamps of a time the vibrations were detected on the trackpads.

Process 1600 includes aggregating the earthquake vibration signals and inputting the aggregated earthquake vibration signals into a machine learning module (1604). For example, the signal receiving module 1442 of the application 1440 may aggregate the received earthquake vibration signals and input the aggregated earthquake vibration signals into the machine learning module 1444. In some implementations, the aggregation is performed based on the location information included in the earthquake vibration signals.

Process 1600 includes processing, by the machine learning module, the aggregated earthquake vibration signals to detect an earthquake in a location (1606). For example, the machine learning module 1444 is configured to process the aggregated earthquake vibration signals to detect an earthquake in a location, as discussed in detail above. Process 1600 includes sending an earthquake alert to the multiple computing devices in response to detecting the earthquake by the machine learning module (1608). For example, the communication module 1446 is configured to send the earthquake alert to the multiple computing devices 1402, 1422*a*-1422*x* in response to the machine learning module 1444 detecting the earthquake. In some implementations, the process 1600 further includes sending the earthquake alert to other multiple computing devices in response to detecting the earthquake by the machine learning module. In some implementations, the process 1600 further includes sending a user feedback option to the multiple computing devices to enable a response to the earthquake alert.

In some implementations, the processing by the machine learning module 1444 includes determining the aggregated earthquake vibration signals are a false positive based on the data from the inductive element in the trackpads not having period vibrations. As a result of determining the aggregated signals amount to a false positive, then an earthquake alert is not sent. In some implementations, the processing by the machine learning module 1444 includes determining the aggregated earthquake vibration signals are a false positive based on locations of the computing devices defining an area within a threshold area. For example, if the vibrations are very localized in small areas, the vibrations may be caused by something other than an earthquake such as, for example, construction.

The described electronic device, system and methods may provide a reliable earthquake detection without the need of installing one or more dedicated seismometers. A large number of electronic devices may be used so as to provide a large coverage and/or granularity in a simple and easily scalable manner. Further, earthquake alerts may be quickly and efficiently distributed.

Further to the descriptions above, a user may be provided with controls allowing the user to make an election as to both if and when systems, programs, or features described herein may enable collection of user information (e.g., a user's current location, zip code, geolocation, etc.), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be encrypted and/or not associated with a specific user account or other user identifiable information where location information is obtained. Thus, the user may have control over what information is collected about the user, how that information is used, and what information is provided to the user.

In addition to not including any personally identifiable information, the information communicated from the electronic devices to the remote server may use only a current state of the electronic device without using any history of the information. For instance, when an electronic device communicates location information as part of the earthquake vibration signal, only a current location of the electronic device may be included as part of the signal. That is, location history information is not included as part of the earthquake vibration signal as part of privacy protection controls. The current location information included in the earthquake vibration signal is not paired with any user identity information when the earthquake vibration signal is sent to the remote server. The earthquake vibration signal may be encrypted, as a further measure of privacy protection. As noted above, the information included in the earthquake vibration signal is anonymously aggregated at the remote server and used only for the purpose of determining if an earthquake is occurring in a particular location based on the aggregated location information so that an earthquake alert may be sent to people in the affected location. The earthquake alert communicated to the affected area may provide people valuable time, even if seconds, to take protective action from the earthquake. Additional privacy protection controls may include storing the received earthquake vibration signals for a limited period of time (e.g., one hour) and then permanently deleting the information from the remote server.

As mentioned above, the user may have control over using the earthquake alert feature or not using the earthquake alert feature including options such as not sending an earthquake vibration signal to the remote server. In some implementations, the user may still elect to receive an earthquake alert even if the user elects not to send an earthquake vibration signal from their electronic device.

Figure 17:
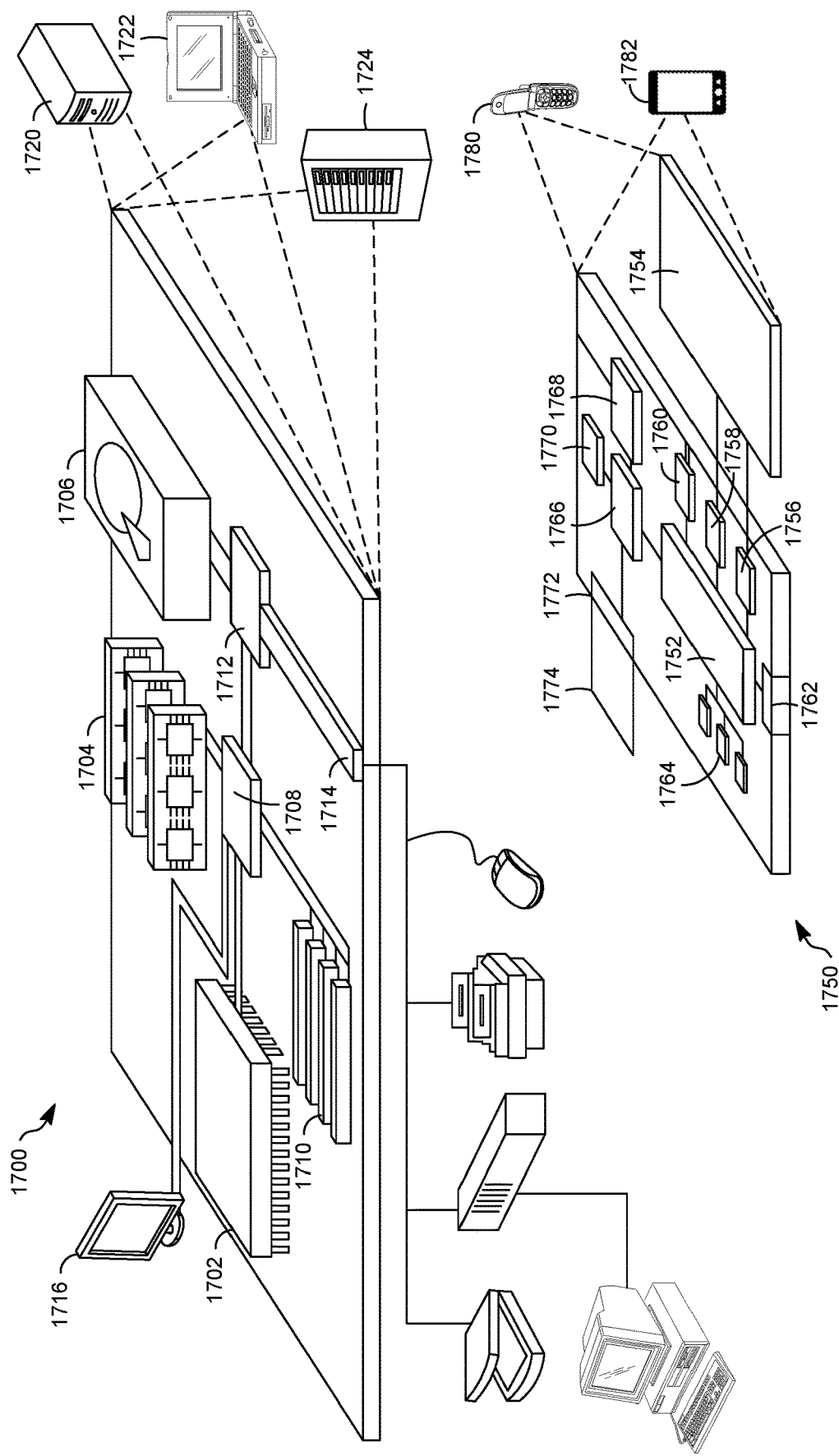
FIG. 17 shows an example of a computer device and a mobile computer device that can be used to implement the techniques described here.

FIG. 17 shows an example of a generic computer device 1700 and a generic mobile computer device 1750, which may be used with the techniques described here. Computing device 1700 is intended to represent various forms of digital computers, such as laptops, desktops, tablets, workstations, personal digital assistants, televisions, servers, blade servers, mainframes, and other appropriate computing devices. Computing device 1750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1700 includes a processor 1702, memory 1704, a storage device 1706, a high-speed interface 1708 connecting to memory 1704 and high-speed expansion ports 1710, and a low speed interface 1712 connecting to low speed bus 1714 and storage device 1706. The processor 1702 can be a semiconductor-based processor. The memory 1704 can be a semiconductor-based memory. Each of the components 1702, 1704, 1706, 1708, 1710, and 1712, are interconnected using various busses, and may be mounted on a common motherboard or in other manners as appropriate. The processor 1702 can process instructions for execution within the computing device 1700, including instructions stored in the memory 1704 or on the storage device 1706 to display graphical information for a GUI on an external input/output device, such as display 1716 coupled to high speed interface 1708. In other implementations, multiple processors and/or multiple buses may be used, as appropriate, along with multiple memories and types of memory. Also, multiple computing devices 1700 may be connected, with each device providing portions of the necessary operations (e.g., as a server bank, a group of blade servers, or a multi-processor system).

The memory 1704 stores information within the computing device 1700. In one implementation, the memory 1704 is a volatile memory unit or units. In another implementation, the memory 1704 is a non-volatile memory unit or units. The memory 1704 may also be another form of computer-readable medium, such as a magnetic or optical disk.

The storage device 1706 is capable of providing mass storage for the computing device 1700. In one implementation, the storage device 1706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1704, the storage device 1706, or memory on processor 1702.

The high speed controller 1708 manages bandwidth-intensive operations for the computing device 1700, while the low speed controller 1712 manages lower bandwidth-intensive operations. Such allocation of functions is exemplary only. In one implementation, the high-speed controller 1708 is coupled to memory 1704, display 1716 (e.g., through a graphics processor or accelerator), and to high-speed expansion ports 1710, which may accept various expansion cards (not shown). In the implementation, low-speed controller 1712 is coupled to storage device 1706 and low-speed expansion port 1714. The low-speed expansion port, which may include various communication ports (e.g., USB, Bluetooth, Ethernet, wireless Ethernet) may be coupled to one or more input/output devices, such as any of the above-described trackpad architectures or assemblies, a keyboard, a pointing device, a scanner, or a networking device such as a switch or router, e.g., through a network adapter.

The computing device 1700 may be implemented in a number of different forms, as shown in the figure. For example, it may be implemented as a standard server 1720, or multiple times in a group of such servers. It may also be implemented as part of a rack server system 1724. In addition, it may be implemented in a personal computer such as a laptop computer 1722. Alternatively, components from computing device 1700 may be combined with other components in a mobile device (not shown), such as device 1750. Each of such devices may contain one or more of computing device 1700, 1750, and an entire system may be made up of multiple computing devices 1700, 1750 communicating with each other.

Computing device 1750 includes a processor 1752, memory 1764, an input/output device such as a display 1754, a communication interface 1766, and a transceiver 1768, among other components. The device 1750 may also be provided with a storage device, such as a microdrive or other device, to provide additional storage. Each of the components 1750, 1752, 1764, 1754, 1766, and 1768, are interconnected using various buses, and several of the components may be mounted on a common motherboard or in other manners as appropriate.

The processor 1752 can execute instructions within the computing device 1750, including instructions stored in the memory 1764. The processor may be implemented as a chipset of chips that include separate and multiple analog and digital processors. The processor may provide, for example, for coordination of the other components of the device 1750, such as control of user interfaces, applications run by device 1750, and wireless communication by device 1750.

Processor 1752 may communicate with a user through control interface 1758 and display interface 1756 coupled to a display 1754. The display 1754 may be, for example, a TFT LCD (Thin-Film-Transistor Liquid Crystal Display) or an OLED (Organic Light Emitting Diode) display, or other appropriate display technology. The display interface 1756 may comprise appropriate circuitry for driving the display 1754 to present graphical and other information to a user. The control interface 1758 may receive commands from a user and convert them for submission to the processor 1752. In addition, an external interface 1762 may be provided in communication with processor 1752, so as to enable near area communication of device 1750 with other devices. External interface 1762 may provide, for example, for wired communication in some implementations, or for wireless communication in other implementations, and multiple interfaces may also be used.

The memory 1764 stores information within the computing device 1750. The memory 1764 can be implemented as one or more of a computer-readable medium or media, a volatile memory unit or units, or a non-volatile memory unit or units. Expansion memory 1774 may also be provided and connected to device 1750 through expansion interface 1772, which may include, for example, a SIMM (Single In Line Memory Module) card interface. Such expansion memory 1774 may provide extra storage space for device 1750, or may also store applications or other information for device 1750. Specifically, expansion memory 1774 may include instructions to carry out or supplement the processes described above, and may include secure information also.

Thus, for example, expansion memory 1774 may be provided as a security module for device 1750, and may be programmed with instructions that permit secure use of device 1750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1764, expansion memory 1774, or memory on processor 1752, that may be received, for example, over transceiver 1768 or external interface 1762.

Device 1750 may communicate wirelessly through communication interface 1766, which may include digital signal processing circuitry where necessary. Communication interface 1766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1768. In addition, short-range communication may occur, such as using a Bluetooth, WiFi, or other such transceiver (not shown). In addition, GPS (Global Positioning System) receiver module 1770 may provide additional navigation- and location-related wireless data to device 1750, which may be used as appropriate by applications running on device 1750.

Device 1750 may also communicate audibly using audio codec 1760, which may receive spoken information from a user and convert it to usable digital information. Audio codec 1760 may likewise generate audible sound for a user, such as through a speaker, e.g., in a handset of device 1750. Such sound may include sound from voice telephone calls, may include recorded sound (e.g., voice messages, music files, etc.) and may also include sound generated by applications operating on device 1750.

The computing device 1750 may be implemented in a number of different forms, as shown in the figure. For example, it may be implemented as a cellular telephone 1780. It may also be implemented as part of a smart phone 1782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and any of the above-described trackpad architectures or assemblies and/or a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, other steps may be provided, or steps may be eliminated, from the described flows, and other components may be added to, or removed from, the described systems. Accordingly, other embodiments are within the scope of the following claims.

What is claimed is:

1. A computer-implemented method for detecting an earthquake, the method comprising:
    detecting vibrations in a trackpad of a computing device using an inductive element and force sensing circuitry of the trackpad;
    processing, by a microcontroller of the computing device, the vibrations for detection of an earthquake vibration signal, wherein processing, by the microcontroller of the computing device, the vibrations for detection of the earthquake vibration signal comprises:
       determining that no touch input is detected on the trackpad;
       determining that the vibrations exceed a threshold vibration level; and in response to determining that no touch input is detected and that the vibrations exceed the threshold vibration level, generating the earthquake vibration signal;
in response to detecting the earthquake vibration signal, communicating, by the computing device, the earthquake vibration signal to a remote server; and
receiving, at the computing device, an earthquake alert from the remote server.

2. The method as in claim 1, wherein detecting the vibrations in the trackpad of the computing device comprises measuring a change in distance in a gap between the inductive element and a target plate of the trackpad.

3. The method as in claim 2, wherein the target plate is a bottom housing of the computing device.

4. The method as in claim 1, wherein the earthquake vibration signal comprises data from the inductive element, a location of the computing device, and a timestamp of detecting the vibrations.

5. The method as in claim 1, further comprising receiving a user feedback option enabling a response to the earthquake alert.

6. A computer-implemented method for detecting an earthquake, the method comprising:
receiving, at a remote server, multiple earthquake vibration signals generated from multiple computing devices through vibrations detected at the computing devices;
aggregating the earthquake vibration signals and inputting the aggregated earthquake vibration signals into a machine learning module;
processing, by the machine learning module, the aggregated earthquake vibration signals to determine whether an earthquake occurred in a particular location; and
in response to determining that the earthquake occurred in the particular location, sending an earthquake alert to one or more computing devices of the multiple computing devices having locations that correspond to the particular location.

7. The computer-implemented method as in claim 6, wherein the vibration signals comprise data from an inductive element in trackpads of the computing devices, locations of the computing devices, and timestamps of a time the vibrations were detected on the trackpads.

8. The computer-implemented method as in claim 7, wherein processing, by the machine learning module, the aggregated earthquake vibration signals comprises determining the aggregated earthquake vibration signals are a false positive based on the data from the inductive element in the trackpads not having periodic vibrations and not sending the earthquake alert.

9. The computer-implemented method as in claim 7, wherein processing, by the machine learning module, the aggregated earthquake vibration signals comprises determining the aggregated earthquake vibration signals are a false positive based on locations of the computing devices defining an area within a threshold area.

10. The computer-implemented method as in claim 6, further comprising sending the earthquake alert to other multiple computing devices in response to detecting the earthquake by the machine learning module.

11. The computer-implemented method as in claim 6, further comprising sending a user feedback option to the multiple computing devices to enable a response to the earthquake alert.

12. An electronic device comprising:
a housing;
a microcontroller disposed in the housing; and
a trackpad mounted to the housing and operably connected to the microcontroller, the trackpad comprising
a substrate,
a stiffener plate,
a circuit board between the substrate and the stiffener plate, the circuit board comprising position detecting circuitry configured to detect a position of an object adjacent the substrate, the circuit board including an inductive element,
a grounding element that electrically connects the stiffener plate and the circuit board to each other, and
force sensing circuitry configured to detect force applied to the substrate, the force detected using the inductive element, wherein
the trackpad is configured to detect vibrations using the inductive element and the force sensing circuitry, and
the microcontroller is configured to
process the vibrations for detection of an earthquake vibration signal, wherein, to process the vibrations for detection of the earthquake vibration signal, the microcontroller is configured to:
determine that no touch input is detected on the trackpad;
determine that the vibrations exceed a threshold vibration level; and
detect, in response to determining that no touch input is detected and that the vibrations exceed the threshold vibration level, the earthquake vibration signal,
in response to detecting the earthquake vibration signal, communicate the earthquake vibration signal to a remote server, and
receive an earthquake alert from the remote server.

13. The electronic device of claim 12, wherein the trackpad is configured to detect the vibrations by measuring a change in distance in a gap between the inductive element and a target plate of the trackpad, wherein a bottom of the housing is the target plate.

14. The electronic device of claim 12, wherein the earthquake vibration signal comprises data from the inductive element, a location of the electronic device, and a timestamp of detecting the vibrations.

15. A system for detecting an earthquake, the system comprising:
at least one memory including instructions; and
at least one processor that is operably coupled to the at least one memory and that is arranged and configured to execute instructions that, when executed, cause the at least one processor to implement an application, the application comprising:
a signal receiving module configured to:
receive multiple earthquake vibration signals generated from multiple computing devices through vibrations detected on trackpads of the computing devices, and
aggregate the earthquake vibration signals and input the aggregated earthquake vibration signals into a machine learning module;
the machine learning module configured to process the aggregated earthquake vibration signals to determine whether an earthquake occurred in a particular location; and
a communication module configured to send, to one or more computing devices of the multiple computing devices having locations that correspond to the particular location, an earthquake alert in response to determining that the earthquake occurred.

16. The system of claim 15, wherein the vibration signals comprise data from an inductive element in the trackpads of the computing devices, locations of the computing devices, and timestamps of a time the vibrations were detected on the trackpads.

17. The system of claim 15, wherein the multiple computing devices comprise first multiple computing devices, and wherein the communication module is further configured to send the earthquake alert to second multiple computing devices having locations that correspond to the particular location in response to determining that the earthquake occurred at the particular location, the second multiple computing devices not included in the first multiple computing devices.

18. The system of claim 15, wherein the communication module is further configured to send a user feedback option to the multiple computing devices to enable a response to the earthquake alert.

* * * * *